US011343044B2

(12) United States Patent
Jiang et al.

(10) Patent No.: US 11,343,044 B2
(45) Date of Patent: May 24, 2022

(54) INFORMATION TRANSMISSION AND DATA DEMODULATION METHODS AND APPARATUSES, COMMUNICATION NODE, AND NETWORK SIDE DEVICE

(71) Applicant: XI'AN ZHONGXING NEW SOFTWARE CO., LTD., Shaanxi (CN)

(72) Inventors: Chuangxin Jiang, Shenzhen (CN); Zhaohua Lu, Shenzhen (CN); Nan Zhang, Shenzhen (CN); Feiming Wang, Shenzhen (CN); Yijian Chen, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/623,168

(22) PCT Filed: Aug. 16, 2018

(86) PCT No.: PCT/CN2018/100868
§ 371 (c)(1),
(2) Date: Dec. 16, 2019

(87) PCT Pub. No.: WO2018/228610
PCT Pub. Date: Dec. 20, 2018

(65) Prior Publication Data
US 2021/0143962 A1 May 13, 2021

(30) Foreign Application Priority Data
Jun. 16, 2017 (CN) .................. 201710458811.X

(51) Int. Cl.
*H04W 76/27* (2018.01)
*H04L 5/00* (2006.01)
(Continued)

(52) U.S. Cl.
CPC ............ *H04L 5/0051* (2013.01); *H04J 13/18* (2013.01); *H04W 72/044* (2013.01)

(58) Field of Classification Search
None
See application file for complete search history.

(56) References Cited

U.S. PATENT DOCUMENTS

2014/0133395 A1   5/2014  Nam et al.
2014/0192750 A1*  7/2014  Noh .................. H04L 5/0026
                                                          370/329
(Continued)

FOREIGN PATENT DOCUMENTS

CN    102237928 A    11/2011
CN    103703813 A     4/2014
(Continued)

OTHER PUBLICATIONS

International Search Report and Written Opinion Form PCT/ISA/210 and PCT/ISA/237, International Application No. PCT/CN2018/100868, pp. 1-6, International Filing Date Aug. 16, 2018 search report dated Nov. 1, 2018.

*Primary Examiner* — Brandon M Renner
(74) *Attorney, Agent, or Firm* — Bond Schoeneck & King, PLLC; George McGuire

(57) ABSTRACT

Provided are information transmission and data demodulation methods and apparatuses, a communication node, and a network side device. The information transmission method includes: transmitting, by a first communication node, a first demodulation reference signal within a first slot, where candidate positions of the first demodulation reference signal within the first slot at least overlap with candidate positions of a second demodulation reference signal within a second slot, the second slot is a slot within which a second communication node transmits the second demodulation reference signal, and a transmission direction of the first
(Continued)

demodulation reference signal within the first slot is different from a transmission direction of the second demodulation reference signal within the second slot.

8 Claims, 12 Drawing Sheets

(51) Int. Cl.
    *H04J 13/18*     (2011.01)
    *H04W 72/04*     (2009.01)

(56) References Cited

U.S. PATENT DOCUMENTS

| | | | | |
|---|---|---|---|---|
| 2014/0211736 A1* | 7/2014 | Noh | ............ | H04W 56/0005 |
| | | | | 370/329 |
| 2015/0146670 A1* | 5/2015 | Liu | ............ | H04L 5/0048 |
| | | | | 370/329 |
| 2015/0271814 A1* | 9/2015 | Park | ............ | H04L 5/0082 |
| | | | | 370/329 |
| 2016/0119947 A1* | 4/2016 | Park | ............ | H04B 7/024 |
| | | | | 370/329 |
| 2017/0006589 A1* | 1/2017 | Park | ............ | H04W 72/005 |
| 2017/0105112 A1* | 4/2017 | Park | ............ | H04W 8/005 |
| 2017/0237542 A1* | 8/2017 | Harrison | ............ | H04W 52/241 |
| | | | | 370/329 |
| 2018/0323830 A1* | 11/2018 | Park | ............ | H04B 7/024 |
| 2018/0359068 A1* | 12/2018 | Kim | ............ | H04W 72/14 |
| 2019/0116467 A1* | 4/2019 | Belleschi | ............ | H04L 1/1819 |
| 2019/0116594 A1* | 4/2019 | Kwak | ............ | H04L 5/0044 |
| 2019/0356437 A1* | 11/2019 | Zhong | ............ | H04L 5/0048 |
| 2020/0266963 A1* | 8/2020 | Song | ............ | H04L 5/0051 |

FOREIGN PATENT DOCUMENTS

| | | |
|---|---|---|
| CN | 105052230 A | 11/2015 |
| CN | 106559194 A | 4/2017 |

* cited by examiner

INFORMATION TRANSMISSION AND DATA DEMODULATION METHODS AND APPARATUSES, COMMUNICATION NODE, AND NETWORK SIDE DEVICE

CROSS-REFERENCE TO RELATED APPLICATION

The present application is a national stage application under 35 U.S.C. 371 based on international patent application PCT/CN2018/100868 filed on Aug. 16, 2018, which claims the priority of Chinese Patent Application No. 201710458811.X filed on Jun. 16, 2017 to the CNIPA, disclosures of both of which are incorporated in the present application by reference in their entireties.

TECHNICAL FIELD

The present application relates to communications and, for example, to information transmission and data demodulation methods and apparatuses, a communication node, and a network side device.

BACKGROUND

At present, physical layer technologies of the new radio (NR) are under discussion in the radio access network (RAN) 1 of the 3rd generation partnership project (3GPP). However, flexibility and efficiency have always been goals pursued by the NR physical layer design. The pursuit of maximum flexibility by a physical layer reference signal also seems to be a trend. This is because requirements for demodulation reference signals may be different for different application scenarios.

For a user with a high delay requirement, the user needs to receive downlink data within a slot, and then feed back to a base station a corresponding signal indicating whether downlink data is correctly transmitted; that is, downlink physical transmission resources allocated by the base station to the user and Acknowledgement (ACK)/Negative Acknowledgement (NACK) feedback indicating whether the downlink data is correctly received by the user are in the same slot. In this case, for the sake of fast demodulation, the demodulation reference signal needs to be placed at a front position in the slot, such that the user can quickly detect the demodulation reference signal for data demodulation.

However, no solution to the problem of setting the position of the demodulation reference signal in the slot exists in the related art.

SUMMARY

Embodiments of the present application provides information transmission and data demodulation methods and apparatuses, a communication node, and a network side device to at least solve the problem that a position of a demodulation reference signal in slot is not set in the related art.

The present application provides an information transmission method. The method includes: transmitting, by a first communication node, a first demodulation reference signal within a first slot; where candidate positions of the first demodulation reference signal within the first slot at least overlap with candidate positions of a second demodulation reference signal within a second slot, the second slot is a slot within which a second communication node transmits the second demodulation reference signal, and a transmission direction of the first demodulation reference signal within the first slot is different from a transmission direction of the second demodulation reference signal within the second slot.

The present application provides a data demodulation method. The method includes: receiving, by a first communication node, first information within a first slot, where the first information includes a data channel and a first demodulation reference signal; and demodulating, by the first communication node, the data channel according to the first demodulation reference signal; where candidate positions of the first demodulation reference signal within the first slot at least overlap with candidate positions of a second demodulation reference signal within a second slot, the second slot is a slot within which a second communication node receives second information, the second information includes the second demodulation reference signal, and a reception direction of the first demodulation reference signal within the first slot is different from a reception direction of the second demodulation reference signal within the second slot.

The present application provides an information transmission method. The method includes: acquiring a multiplexing manner of a plurality of signals, and transmitting the multiplexing manner of the plurality of signals to a terminal via specified signaling.

The present application provides an information transmission apparatus. The apparatus is disposed in a first communication node and includes a transmission module, which is configured to transmit a first demodulation reference signal within a first slot; where, candidate positions of the first demodulation reference signal within the first slot at least overlap with candidate positions of a second demodulation reference signal within a second slot, the second slot is a slot within which a second communication node transmits the second demodulation reference signal, and a transmission direction of the first demodulation reference signal within the first slot is different from a transmission direction of the second demodulation reference signal within the second slot.

The present application provides a data demodulation apparatus. The apparatus is disposed in a first communication node and includes: a reception module, which is configured to receive first information within a first slot, where the first information includes a data channel and a first demodulation reference signal; and a demodulation module, which is configured to demodulate the data channel according to the first demodulation reference signal; where, candidate positions of the first demodulation reference signal within the first slot at least overlap with candidate positions of a second demodulation reference signal within a second slot, the second slot is a slot within which a second communication node receives second information, the second information comprises the second demodulation reference signal, and a reception direction of the first demodulation reference signal within the first slot is different from a reception direction of the second demodulation reference signal within the second slot.

The present application provides an information transmission apparatus. The apparatus includes: an acquisition module, which is configured to acquire a multiplexing manner of a plurality of signals; and a transmission module, which is configured to transmit the multiplexing manner of the plurality of signals to a terminal via specified signaling.

The present application provides a communication node. The communication node includes a memory, a processor coupled with the processor, and a computer program stored in the memory and operable on the processor, where the processor, when executing the computer program, is configured to implement a following operation: transmitting a first demodulation reference signal within a first slot, where candidate positions of the first demodulation reference signal within the first slot at least overlap with candidate positions of a second demodulation reference signal within a second slot, the second slot is a slot within which a second communication node transmits the second demodulation reference signal, and a transmission direction of the first demodulation reference signal within the first slot is different from a transmission direction of the second demodulation reference signal within the second slot.

The present application provides a communication node. The communication node includes a memory, a processor coupled with the processor, and a computer program stored in the memory and operable on the processor, where the processor, when executing the computer program, is configured to implement following operations: receiving first information within a first slot, where the first information includes a data channel and a first demodulation reference signal; and demodulating the data channel according to the first demodulation reference signal; where, candidate positions of the first demodulation reference signal within the first slot at least overlap with candidate positions of a second demodulation reference signal within a second slot, the second slot is a slot within which a specified communication node receives second information, the second information includes the second demodulation reference signal, and a reception direction of the first demodulation reference signal within the first slot is different from a reception direction of the second demodulation reference signal within the second slot.

The present application provides a communication node. The communication node includes a processor, a memory coupled with the processor, and a computer program stored in the memory and operable on the processor, where the processor, when executing the computer program, is configured to implement following operations: acquiring a multiplexing manner of a plurality of signals, and transmitting the multiplexing manner of the plurality of signals to a terminal via specified signaling.

The present application further provides a storage medium. The storage medium includes stored programs which, when executed on the processor, execute any one of methods described above.

The present application further provides a processor. The processor is configured to execute programs which, when executed on the processor, execute any one of methods described above.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings:

FIG. 17 is a schematic diagram of a pattern of a mapped DMRS according to an application embodiment 2 of the present application;

FIG. 18 is a schematic diagram of a mapping of a DMRS port to a resource according to an application embodiment of the present application;

FIG. 19 is a schematic diagram of a DMRS port mapping according to an application embodiment 3 of the present application;

FIG. 20 is a schematic diagram of a mapping of a DMRS port to a resource according to an application embodiment 3 of the present application;

FIG. 21 is a schematic diagram of a DMRS pattern of 12 ports according to an application embodiment 3 of the present application;

DETAILED DESCRIPTION

The present application will be described hereinafter in detail with reference to the drawings and in conjunction with embodiments. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Figure 1:
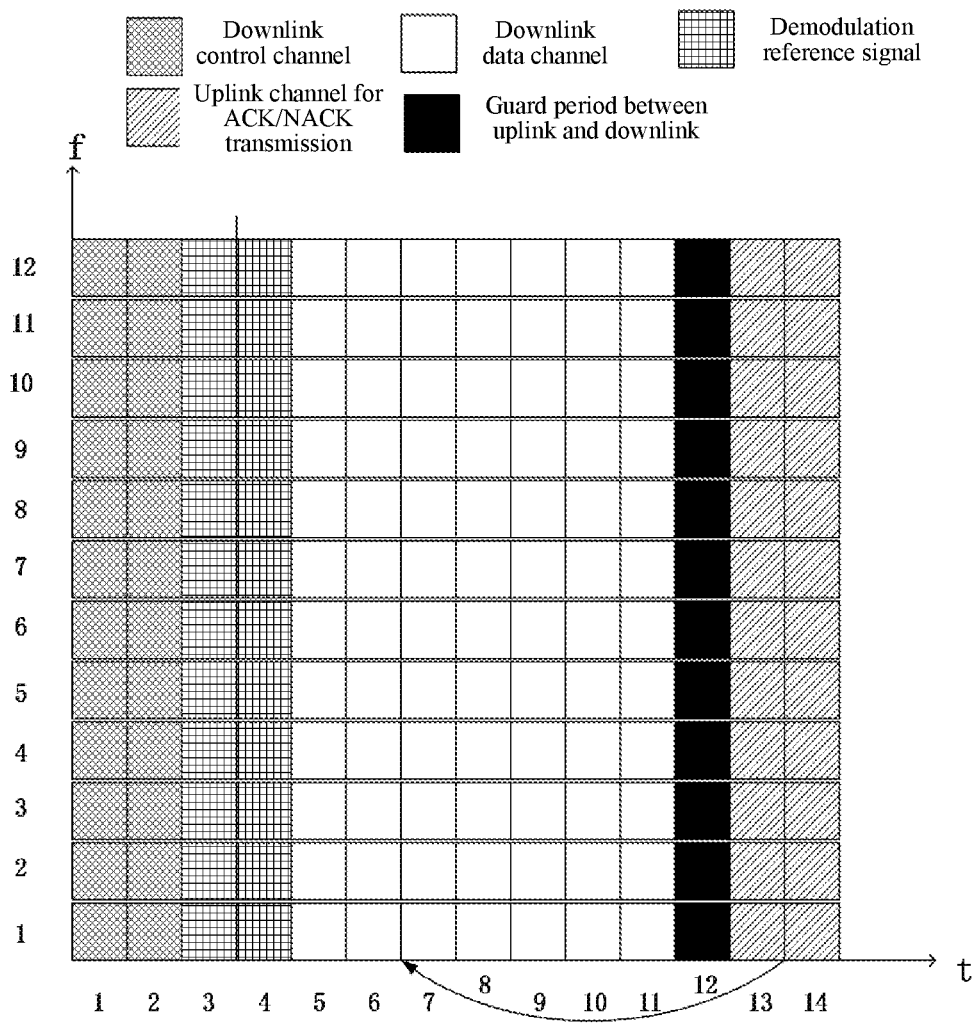
FIG. 1 is a structural diagram of a slot in the related art.

FIG. 1 is a structural diagram of a slot in the related art. As shown in FIG. 1, for a certain user or a certain service, downlink data transmission and corresponding ACK/NACK feedback are in the same slot, which can be called a self-contained slot, such that delay of the ACK/NACK feedback can be greatly reduced, thereby facilitating service transmission with high timeliness requirements. In FIG. 1, this slot contains 14 orthogonal frequency division multiplexing (OFDM) symbols. A base station schedules downlink data to a user via downlink control channels of first two symbols and places demodulation reference signals (DMRSs) on the third and the fourth time domain symbols, and the user, after detecting the downlink data, feeds back ACK/NACK on last two symbols of this slot. If the user correctly detects a downlink data channel, the user feeds the ACK back to the base station; otherwise, the user feeds the NACK back to the base station.

Generally, in order to support this self-contained slot structure, the signal design related to demodulation needs to facilitate fast demodulation as much as possible, thereby implementing ACK/NACK fast feedback. The DMRS placed in a front position in a slot is called the front loaded DMRS. How to set the DMRS is not discussed in the related art.

For a user or a service with low delay requirements, the ACK/NACK feedback does not need to be too fast. In this case, the ACK/NACK feedback can be several slots later than the downlink data channel. In this case, the design of the DMRS is not limited to the front loaded DMRS.

In addition, in the NR, it is agreed that the DMRSs are divided into multiple DMRS groups, and different DMRS groups can have different quasi-colocated (QCL) assumptions. However, how to group DMRSs is yet not discussed.

In view of the above technical problems in the related art, no effective solution has yet been proposed.

Embodiment 1

Figure 2:
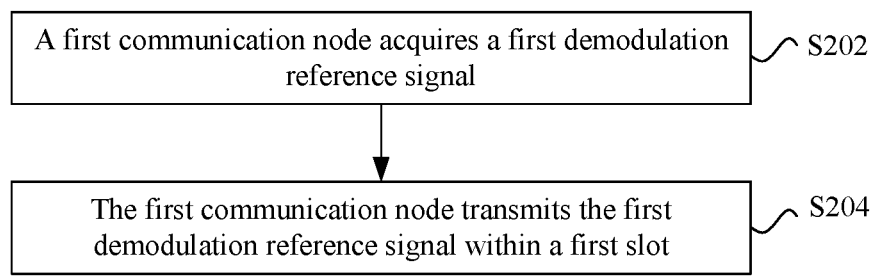
FIG. 2 is a flowchart of an information transmission method according to an embodiment 1 of the present application.

An information transmission method is provided in this embodiment. FIG. 2 is a flowchart of an information transmission method according to an embodiment 1 of the present application. As shown in FIG. 2, the method includes steps S202 and S204.

In step S202, a first communication node acquires a first DMRS.

In step S204, the first communication node transmits the first DMRS within a first slot.

Candidate positions of the first DMRS within the first slot at least overlap with candidate positions of a second DMRS within a second slot, the second slot is a slot within which a second communication node transmits the second DMRS, and a transmission direction of the first DMRS within the first slot is different from a transmission direction of the second DMRS within the second slot.

Through the above steps, the first communication node transmits the first DMRS within the first slot, where candidate positions of the first DMRS within the first slot at least overlap with candidate positions of the second DMRS within the second slot, the second slot is a slot within which the second communication node transmits the second DMRS, and the transmission direction of the first DMRS within the first slot is different from a transmission direction of the second DMRS within the second slot, that is, by overlapping the candidate positions of the first DMRS within the first slot and the candidate positions of the second DMRS within the second slot, the setting of a position of the DMRS is implemented. Therefore, the problem that the position of the DMRS in the slot is not set in the relate art can be solved, ensuring an effect of detecting interference between the uplink and downlink DMRSs.

In an embodiment, the step S202 may be performed separately or may be performed in combination with the step S204, but it is not limited thereto.

In an embodiment, the first communication node may be a network side device, or may be a terminal, but it is not limited thereto; and the second communication node may be a network side device, or may be a terminal, but it is not limited thereto. In an embodiment, in a case where the first communication node is a network side device, the second communication node is a terminal, and in a case where the first communication node is a terminal, the second communication node is a network side device, which is not limited thereto. For example, in a case where the first communication node is a first network side device, the second communication node is a first terminal, and in a case where the first communication node is a second terminal, the second communication node is a second network side device. The first terminal and the second terminal may be the same or different, and the first network side device and the second network side device may be the same or different, which is not limited thereto.

In an embodiment, the first slot or the second slot may, but is not limited to, be a self-contained slot.

In an embodiment, candidate positions of the first DMRS within the first slot at least overlap with candidate positions of the second DMRS within the second slot, where the transmission direction of the first DMRS within the first slot is different from the transmission direction of the second DMRS within the second slot. The first slot and the second slot may be the same slot, or may be different slots. When the first slot and the second slot are the same slot, in this case, transmission of the first DMRS within the first slot and transmission of the second DMRS within the second slot may be performed in different cells. When the first slot is different from the second slot, in this case, the transmission of the first DMRS within the first slot and the transmission of the second DMRS within the second slot may be performed in the same cell or different cells. The difference between the transmission direction of the first DMRS within the first slot and the transmission direction of the second DMRS within the second slot refers to uplink transmission or downlink transmission. For example, the first DMRS within the first slot is transmitted in a downlink manner, that is, a base station transmits the first DMRS, and the second DMRS within the second slot is transmitted in an uplink manner, that is, a user terminal transmits the second DMRS. The candidate positions of the first DMRS within the first slot refers to some positions in multiple possible positions of the first DMRS, or refers to positions occupied by some of multiple patterns of the first DMRS. The position herein may refer to a relative position in a slot, that is, which time domain symbol in this slot is occupied in one slot.

Figures 22, 23:
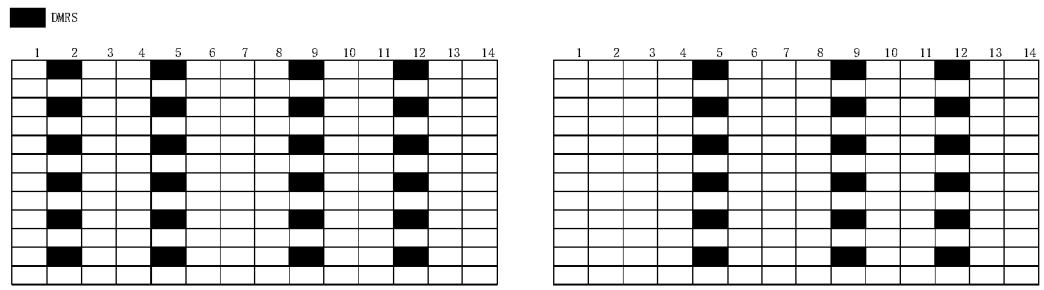
FIG. 22 is a schematic diagram of a mapping of a port to a resource according to an application embodiment 4 of the present application.
FIG. 23 is a schematic diagram of a DMRS pattern according to an application embodiment 6 of the present application.

For example, in FIG. 23, a pattern (left figure) of a DMRS occupies four positions, and in this case, the candidate positions of this DMRS are symbols 2, 5, 9 and 12. In FIG. 22, a pattern of a DMRS occupies two time domain symbols, and this pattern has two candidate positions, that is, symbols 4 and 5.

Candidate positions of the DMRS within the first slot at least overlap with candidate positions of the DMRS within the second slot. The main emphasis herein is positions of the DMRS in some downlink patterns and positions of the DMRS in some uplink pattern. For example, there is the front loaded DMRS. Since patterns contained by the DMRS may have a pattern of a front loaded DMRS and a pattern of a non-front loaded DMRS, the candidate positions of the DMRS within the first slot refer to positions of some patterns of the DMRS, but not necessarily positions of all patterns.

In an embodiment, in a case where the first DMRS is an uplink DMRS, the second DMRS is a downlink DMRS, and in a case where the first DMRS is a downlink DMRS, the second DMRS is an uplink DMRS.

In an embodiment, the candidate positions of the first DMRS within the first slot overlapping with the candidate positions of the second DMRS within the second slot includes: the candidate position of the first DMRS occupying r symbols within the first slot, and the candidate position of the second DMRS occupying p symbols within the second slot; where serial numbers of the r symbols within the first slot partially overlap with serial numbers of the p symbols within the second slot, and r and p are integers greater than 0.

In an embodiment, in a case where the candidate positions of the first DMRS within the first slot occupy one symbol of the first slot, the first DMRS is mapped to an n-th symbol of the first slot, and in a case where the candidate positions of the first DMRS within the first slot occupy two symbols of the first slot, the first DMRS is mapped to an n-th symbol and an m-th symbol of the first slot; where n is an integer greater than 1, and m is an integer greater than 0.

In an embodiment, n is a pre-defined fixed value, and m is a pre-defined value.

In an embodiment of the present application, in a case where the first DMRS is a downlink DMRS, the fixed value of m is (n−1), and in a case where the first DMRS is an uplink DMRS, the fixed value of m is (n+1).

In an embodiment of the present application, in a case where the first DMRS is a downlink DMRS, the value of m is (n−1), and in a case where the first DMRS is an uplink DMRS, m is equal to (n+1) or (n−1). If the uplink DMRS can be placed on the (n−1)-th symbol, m is (n−1); otherwise, m is (n+1). For example, if the (n−1)-th symbol is an uplink transmission symbol, m is (n−1).

In an embodiment, in a case where m is less than n and the first DMRS corresponds to N ports, a first port to an (N/2)-th port in the N ports are mapped to the n-th symbol of the first slot, and an (N/2+1)-th port to an N-th port in the N ports are mapped to the m-th symbol of the first slot; where, N is an even number, and serial numbers of the first port to the (N/2)-th port are less than serial numbers of the (N/2+1)-th port to the N-th port. It can ensure that the DMRS is as front as possible, facilitating the fast demodulation.

In an embodiment, in a case where a value of N is 12, the first port to the sixth port are mapped to the n-th symbol of the first slot, and the seventh port to the twelfth port are mapped to the m-th symbol.

In an embodiment of the present application, in a physical resource transport block corresponding to the first slot, in a case where the first DMRS corresponds to M ports, the M ports correspond to multiple DMRS mapping groups; where, multiple ports in the same DMRS mapping group are code-division multiplexed on multiple adjacent resource elements, the multiple ports are differentiated via orthogonal cover codes (OCCs), and M is an even number.

In an embodiment, in a case where the number of ports contained in a port candidate value allocated to a user terminal is less than or equal to M/2, the ports contained in the port candidate value come from different DMRS mapping groups.

In an embodiment, in a case where the number of ports contained in the port candidate value allocated to the user terminal is two, the ports contained in the port candidate value come from two different DMRS mapping groups.

In an embodiment, the multiple DMRS mapping groups correspond to different QCL assumptions.

In an embodiment, the first DMRSs are divided into multiple DMRS groups via the DMRS mapping group.

In an embodiment, for the second DMRS, reference can be made to the description of the first DMRS. For example, in a case where the second DMRS corresponds to multiple ports, multiple DMRS mapping groups can be corresponded, but features are not limited hereto.

Embodiment 2

Figure 3:
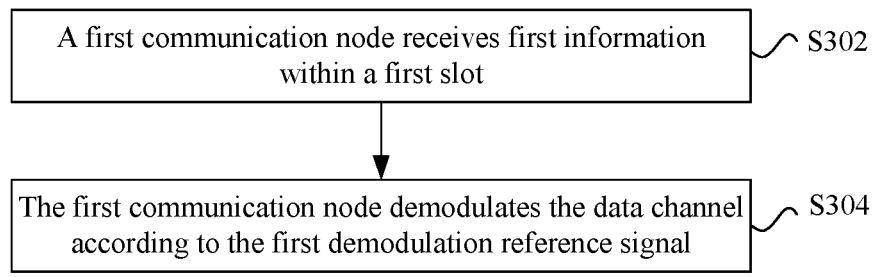
FIG. 3 is a flowchart of a data demodulation method according to an embodiment of the present application.

This embodiment provides a data demodulation method. FIG. 3 is a flowchart of a data demodulation method according to an embodiment of the present application. As shown in FIG. 3, the method includes steps S302 and S304.

In step S302, a first communication node receives first information within a first slot; where the first information includes a data channel and a first DMRS.

In step S304, the first communication node demodulates the data channel according to the first DMRS.

Candidate positions of the first DMRS within the first slot at least overlap with candidate positions of a second DMRS within a second slot, the second slot is a slot within which a second communication node receives second information, the second information includes the second DMRS, and a reception direction of the first DMRS within the first slot is different from a reception direction of the second DMRS within the second slot.

Through the above steps, the first communication node receives the first information within the first slot, where the first information includes a data channel and a first DMRS; and the first communication node demodulates the data channel according to the first DMRS; where candidate positions of the first DMRS within the first slot at least overlap with candidate positions of the second DMRS within the second slot, the second slot is a slot within which the second communication node receives the second information, and the second information includes the second DMRS, that is, by overlapping the candidate positions of the first DMRS within the first slot and the candidate positions of the second DMRS within the second slot, the setting of the position of the DMRS is implemented. Therefore, the problem that the position of the DMRS in the slot is not set in the relate art can be solved, ensuring the effect of detecting interference between the uplink and downlink DMRSs.

In an embodiment, the first communication node may be a network side device, or may be a terminal, but it is not limited thereto; and the second communication node may be a network side device, or may be a terminal, but it is not limited thereto. In an embodiment, in a case where the first communication node is a network side device, the second communication node is a terminal, and in a case where the first communication node is a terminal, the second communication node is a network side device, which is not limited thereto. For example, in a case where the first communication node is a network side device and the second communication node is a terminal, the first information may be information sent by a first terminal and received by a first network side device, and the second information may be information sent by a second network side device and received by a second terminal. The first terminal and the second terminal may be different, and the first network side device and the second network side device may be different, which is not limited thereto.

In an embodiment, the first slot or the second slot may, but is not limited to, be a self-contained slot.

In an embodiment, candidate positions of the first DMRS within the first slot at least overlap with candidate positions of the second DMRS within the second slot, where the reception direction of the first DMRS within the first slot is different from the reception direction of the second DMRS within the second slot. The first slot and the second slot may be the same slot, or may be different slots. For example, when the first slot and the second slot are the same slot, in this case, reception of the first DMRS within the first slot and reception of the second DMRS within the second slot may be performed in different cells. When the first slot is different from the second slot, in this case, the reception of the first DMRS within the first slot and the reception of the second DMRS within the second slot may be performed in the same cell or different cells. The difference between the transmission direction of the first DMRS within the first slot and the transmission direction of the second DMRS within the second slot refers to uplink transmission or downlink transmission. For example, the first DMRS within the first slot is transmitted in a downlink manner, that is, a base station transmits the first DMRS, and the second DMRS within the second slot is transmitted in an uplink manner, that is, a user terminal transmits the second DMRS. The candidate positions of the first DMRS within the first slot refers to some positions in multiple possible positions of the first DMRS, or refers to positions occupied by some of multiple patterns of the first DMRS. The position herein may refer to a relative position in a slot, that is, which time domain symbol in this slot is occupied in one slot.

For example, in FIG. 23, a pattern (left figure) of a DMRS occupies four positions, and in this case, the candidate positions of this DMRS are symbols 2, 5, 9 and 12. In FIG. 22, a pattern of a DMRS occupies two time domain symbols, and this pattern has two candidate positions, that is, symbols 4 and 5.

Candidate positions of the DMRS within the first slot at least overlap with candidate positions of the DMRS within the second slot. The main emphasis herein is positions of the first DMRS in some downlink patterns and positions of the second DMRS in some uplink pattern. For example, the first DMRS and the second DMRS both may be the front loaded DMRS. Since patterns contained by the first DMRS or the second DMRS may have a pattern of a front loaded DMRS and a pattern of a non-front loaded DMRS, the candidate positions of the first DMRS within the first slot refer to positions of some patterns of the first DMRS, but not necessarily positions of all patterns.

In an embodiment, in a case where the first DMRS is an uplink DMRS, the second DMRS is a downlink DMRS, and in a case where the first DMRS is a downlink DMRS, the second DMRS is an uplink DMRS.

In an embodiment, the candidate positions of the first DMRS within the first slot at least overlapping with the candidate positions of the second DMRS within the second slot includes: the candidate position of the first DMRS occupying r symbols within the first slot, and the candidate position of the second DMRS occupying p symbols within the second slot; where serial numbers of the r symbols within the first slot at least partially overlap with serial numbers of the p symbols within the second slot, and r and p are integers greater than 0.

In an embodiment, in a case where the candidate positions of the first DMRS within the first slot occupy one symbol of the first slot, the first DMRS is mapped to an n-th symbol of the first slot, and in a case where the candidate positions of the first DMRS within the first slot occupy two symbols of the first slot, the first DMRS is mapped to an n-th symbol and an m-th symbol of the first slot; where n is an integer greater than 1, and m is an integer greater than 0.

In an embodiment, n is a pre-defined fixed value, and m is a pre-defined value.

In an embodiment of the present application, in a case where the first DMRS is a downlink DMRS, the fixed value of m is (n−1), and in a case where the first DMRS is an uplink DMRS, the fixed value of m is (n+1).

In an embodiment of the present application, in a case where the first DMRS is a downlink DMRS, the value of m is (n−1), and in a case where the first DMRS is an uplink DMRS, m is equal to (n+1) or (n−1). If the uplink DMRS can be placed on the (n−1)-th symbol, m is (n−1); otherwise, m is (n+1). For example, if the (n−1)-th symbol is an uplink transmission symbol, m is (n−1).

In an embodiment, in a case where m is less than n and the first DMRS corresponds to N ports, a first port to an (N/2)-th port in the N ports are mapped to the n-th symbol of the first slot, and an (N/2+1)-th port to an N-th port in the N ports are mapped to the m-th symbol of the first slot; where, N is an even number, and serial numbers of the first port to the (N/2)-th port are less than serial numbers of the (N/2+1)-th port to the N-th port. It can ensure that the DMRS is as front as possible, facilitating the fast demodulation.

In an embodiment, in a case where a value of N is 12, the first port to the sixth port are mapped to the n-th symbol of the first slot, and the seventh port to the twelfth port are mapped to the m-th symbol.

In an embodiment of the present application, in a physical resource transport block corresponding to the first slot, in a case where the first DMRS corresponds to M ports, the M ports correspond to multiple DMRS mapping groups; where, multiple ports in the same DMRS mapping group are code-division multiplexed on multiple adjacent resource elements, the multiple ports are differentiated via OCCs, and M is an even number.

In an embodiment, in a case where the number of ports contained in a port candidate value allocated to a user terminal is less than or equal to M/2, the ports contained in the port candidate value come from different DMRS mapping groups.

In an embodiment, in a case where the number of ports contained in the port candidate value allocated to the user terminal is two, the ports contained in the port candidate value come from two different DMRS mapping groups.

In an embodiment, the multiple DMRS mapping groups correspond to different QCL assumptions.

In an embodiment, the first DMRSs are divided into multiple DMRS groups via the DMRS mapping group.

In an embodiment, for the second DMRS, reference can be made to the description of the first DMRS. For example, in a case where the second DMRS corresponds to multiple ports, multiple DMRS mapping groups can be corresponded, but features are not limited hereto.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation. Based on this understanding, the solution provided by the present application substantially, or the part contributing to the existing art, may be embodied in the form of a software product. The computer software product is stored on a storage medium (such as a read-only memory (ROM)/random access memory (RAM), a magnetic disk or an optical disk) and includes several instructions for enabling a terminal device (which may be a mobile phone, a computer, a server or a network device) to execute the method according to each embodiment of the present application.

Embodiment 3

Figure 4:
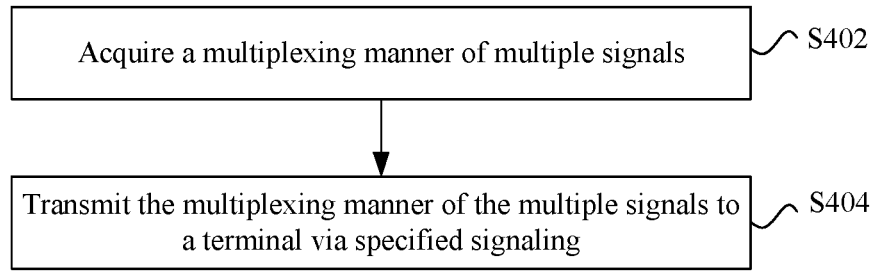
FIG. 4 is a flowchart of an information transmission method according to an embodiment of the present application.

The embodiment of the present invention provides an information transmission method. FIG. 4 is a flowchart of an information transmission method according to an embodiment of the present application. As shown in FIG. 4, the method includes the steps S402 and S404.

In step S402, a multiplexing manner of multiple signals is acquired.

In step S404, the multiplexing manner of the multiple signals is transmitted to a terminal via specified signaling.

Through the above steps, by transmitting the multiplexing manner of the multiple signals to the terminal via the specified signaling, signaling overhead can be greatly reduced.

In an embodiment, the multiple signal may include, but is not be limited to, at least two of following signals: an uplink DMRS, a downlink DMRS, a physical uplink control channel, a channel state information reference signal (CSI-RS) and an uplink channel sounding reference signal (SRS).

In an embodiment, the specified signaling may include radio resource control (RRC) signaling.

In an embodiment, the RRC signaling is configured to be high-layer signaling indicating whether phase-tracking reference signals (PTRSs) exist.

In an embodiment, the multiplexing manner may include that the multiple signals are code-division multiplexed in the time domain or that the multiple signals are not code-division multiplexed in the time domain.

In an embodiment, the above-mentioned steps may, but are not limited to, be executed by a network side device, such as a base station.

Embodiment 4

This embodiment further provides an information transmission apparatus. The apparatus is configured to implement the above-mentioned embodiments and preferred embodiments. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 5:
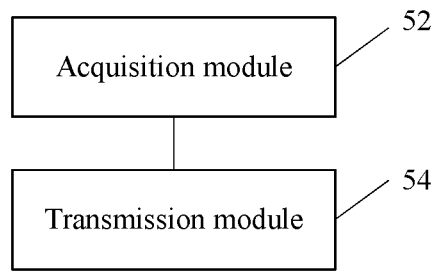
FIG. 5 is a structural block diagram of an information transmission apparatus according to an embodiment 4 of the present application.

FIG. 5 is a structural block diagram of an information transmission apparatus according to an embodiment 4 of the present application. This apparatus may be disposed in a first communication node, and as shown in FIG. 5, the apparatus includes an acquisition module 52 and a transmission module 54.

The acquisition module 52 is configured to acquire a multiplexing manner of multiple signals.

The transmission module 54 is connected to the acquisition module 52 and is configured to transmit the multiplexing manner of the multiple signals to a terminal via specified signaling. Candidate positions of the first DMRS within the first slot at least overlap with candidate positions of a second DMRS within a second slot, the second slot is a slot within which a second communication node transmits the second DMRS, and a transmission direction of the first DMRS within the first slot is different from a transmission direction of the second DMRS within the second slot.

Through the above apparatus, by overlapping the candidate positions of the first DMRS within the first slot and the candidate positions of the second DMRS within the second slot, the setting of the position of the DMRS is implemented. Therefore, the problem that the position of the DMRS in the slot is not set in the relate art can be solved, ensuring the effect of detecting interference between the uplink and downlink DMRSs.

In an embodiment, the transmission module 54 may be disposed separately or disposed together with the acquisition module 52, but it is not limited thereto.

In an embodiment, the first communication node may be a network side device, or may be a terminal, but it is not limited thereto; and the second communication node may be a network side device, or may be a terminal, but it is not limited thereto. In an embodiment, in a case where the first communication node is a network side device, the second communication node is a terminal, and in a case where the first communication node is a terminal, the second communication node is a network side device, which is not limited thereto. For example, in a case where the first communication node is a first network side device, the second communication node is a first terminal, and in a case where the first communication node is a second terminal, the second communication node is a second network side device. The first terminal and the second terminal may be the same or different, and the first network side device and the second network side device may be the same or different, which is not limited thereto.

In an embodiment, the first slot or the second slot may, but is not limited to, be a self-contained slot.

In an embodiment, candidate positions of the first DMRS within the first slot at least overlap with candidate positions of the second DMRS within the second slot, where the transmission direction of the first DMRS within the first slot is different from the transmission direction of the second DMRS within the second slot. The first slot and the second slot may be the same slot, or may be different slots. For example, when the first slot and the second slot are the same slot, in this case, transmission of the first DMRS within the first slot and transmission of the second DMRS within the second slot may be performed in different cells. When the first slot is different from the second slot, in this case, the transmission of the first DMRS within the first slot and the transmission of the second DMRS within the second slot may be performed in the same cell or different cells. The difference between the transmission direction of the first DMRS within the first slot and the transmission direction of the second DMRS within the second slot refers to uplink transmission or downlink transmission. For example, the first DMRS within the first slot is transmitted in a downlink manner, that is, a base station transmits the first DMRS, and the second DMRS within the second slot is transmitted in an uplink manner, that is, a user terminal transmits the second DMRS. The candidate positions of the first DMRS within the first slot refers to some positions in multiple possible positions of the first DMRS, or refers to positions occupied by some of multiple patterns of the first DMRS. The position herein may refer to a relative position in a slot, that is, which time domain symbol in this slot is occupied in one slot.

For example, in the left figure of FIG. 23, a pattern of a DMRS occupies four positions, and in this case, the candidate positions of this DMRS are symbols 2, 5, 9 and 12. In FIG. 22, a pattern of a DMRS occupies two time domain symbols, and this pattern has two candidate positions, that is, symbols 4 and 5.

Candidate positions of the DMRS within the first slot at least overlap with candidate positions of the DMRS within the second slot. The main emphasis herein is positions of the DMRS in some downlink patterns and positions of the DMRS in some uplink pattern. For example, there is the front loaded DMRS. Since patterns contained by the DMRS may have a pattern of a front loaded DMRS and a pattern of a non-front loaded DMRS, the candidate positions of the DMRS within the first slot refer to positions of some patterns of the DMRS, but not necessarily positions of all patterns.

In an embodiment, in a case where the first DMRS is an uplink DMRS, the second DMRS is a downlink DMRS, and in a case where the first DMRS is a downlink DMRS, the second DMRS is an uplink DMRS.

In an embodiment, the candidate positions of the first DMRS within the first slot overlapping with the candidate positions of the second DMRS within the second slot includes: the candidate position of the first DMRS occupying r symbols within the first slot, and the candidate position of the second DMRS occupying p symbols within the second slot; where serial numbers of the r symbols within the first slot partially overlap with serial numbers of the p symbols within the second slot, and r and p are integers greater than 0.

In an embodiment, in a case where the candidate positions of the first DMRS within the first slot occupy one symbol of the first slot, the first DMRS is mapped to an n-th symbol of the first slot, and in a case where the candidate positions of the first DMRS within the first slot occupy two symbols of the first slot, the first DMRS is mapped to an n-th symbol and an m-th symbol of the first slot; where n is an integer greater than 1, and m is an integer greater than 0.

In an embodiment, n is a pre-defined fixed value, and m is a pre-defined value.

In an embodiment of the present application, in a case where the first DMRS is a downlink DMRS, the fixed value of m is (n−1), and in a case where the first DMRS is an uplink DMRS, the fixed value of m is (n+1).

In an embodiment of the present application, in a case where the first DMRS is a downlink DMRS, the value of m is (n−1), and in a case where the first DMRS is an uplink DMRS, m is equal to (n+1) or (n−1). If the uplink DMRS can be placed on the (n−1)-th symbol, m is (n−1); otherwise, m is (n+1). For example, if the (n−1)-th symbol is an uplink transmission symbol, m is (n−1).

In an embodiment, in a case where m is less than n and the first DMRS corresponds to N ports, a first port to an (N/2)-th port in the N ports are mapped to the n-th symbol of the first slot, and an (N/2+1)-th port to an N-th port in the N ports are mapped to the m-th symbol of the first slot; where, N is an even number, and serial numbers of the first port to the (N/2)-th port are less than serial numbers of the (N/2+1)-th port to the N-th port. It can ensure that the DMRS is as front as possible, facilitating the fast demodulation.

In an embodiment, in a case where a value of N is 12, the first port to the sixth port are mapped to the n-th symbol of the first slot, and the seventh port to the twelfth port are mapped to the m-th symbol.

In an embodiment of the present application, in a physical resource transport block corresponding to the first slot, in a case where the first DMRS corresponds to M ports, the M ports correspond to multiple DMRS mapping groups; where, multiple ports in the same DMRS mapping group are code-division multiplexed on multiple adjacent resource elements, the multiple ports are differentiated via OCCs, and M is an even number.

In an embodiment, in a case where the number of ports contained in a port candidate value allocated to a user terminal is less than or equal to M/2, the ports contained in the port candidate value come from different DMRS mapping groups.

In an embodiment, in a case where the number of ports contained in the port candidate value allocated to the user terminal is two, the ports contained in the port candidate value come from two different DMRS mapping groups.

In an embodiment, the multiple DMRS mapping groups correspond to different QCL assumptions.

In an embodiment, the first DMRSs are divided into multiple DMRS groups via the DMRS mapping group.

In an embodiment, for the second DMRS, reference can be made to the description of the first DMRS. For example, in a case where the second DMRS corresponds to multiple ports, multiple DMRS mapping groups can be corresponded, but features are not limited hereto.

Embodiment 5

This embodiment further provides a data demodulation apparatus. The apparatus is configured to implement the above-mentioned embodiments and preferred embodiments. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 6:
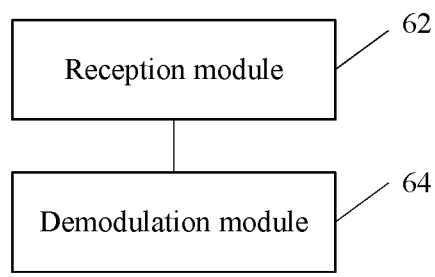
FIG. 6 is a structural block diagram of a data demodulation apparatus according to an embodiment of the present application.

FIG. 6 is a structural block diagram of a data demodulation apparatus according to an embodiment of the present application. This apparatus may be disposed in a first communication node, and as shown in FIG. 6, the apparatus includes a reception module 62 and a demodulation module 64.

The reception module 62 is configured to receive first information within a first slot; where the first information includes a data channel and a first DMRS.

The demodulation module 64 is connected to the reception module 62 and is configured to demodulate the data channel according to the first demodulation reference signal. Candidate positions of the first DMRS within the first slot at least overlap with candidate positions of a second DMRS within a second slot, the second slot is a slot within which a second communication node receives the second DMRS, and a reception direction of the first DMRS within the first slot is different from a reception direction of the second DMRS within the second slot.

Through the above apparatus, the first communication node receives the first information within the first slot, where the first information includes a data channel and a first DMRS; and the first communication node demodulates the data channel according to the first DMRS; where candidate positions of the first DMRS within the first slot at least overlap with candidate positions of the second DMRS within the second slot, the second slot is a slot within which the second communication node receives the second information, and the second information includes the second DMRS, that is, by overlapping the candidate positions of the first DMRS within the first slot and the candidate positions of the second DMRS within the second slot, the setting of the position of the DMRS is implemented. Therefore, the problem that the position of the DMRS in the slot is not set in the relate art can be solved, ensuring the effect of detecting interference between the uplink and downlink DMRSs.

In an embodiment, the first communication node may be a network side device, or may be a terminal, but it is not limited thereto; and the second communication node may be a network side device, or may be a terminal, but it is not limited thereto. In an embodiment, in a case where the first communication node is a network side device, the second communication node is a terminal, and in a case where the first communication node is a terminal, the second communication node is a network side device, which is not limited thereto. For example, in a case where the first communication node is a network side device and the second communication node is a terminal, the first information may be information sent by a first terminal and received by a first network side device, and the second information may be information sent by a second network side device and received by a second terminal. The first terminal and the second terminal may be different, and the first network side device and the second network side device may be different, which is not limited thereto.

In an embodiment, the first slot or the second slot may, but is not limited to, be a self-contained slot.

In an embodiment, candidate positions of the first DMRS within the first slot at least overlap with candidate positions of the second DMRS within the second slot, where the reception direction of the first DMRS within the first slot is different from the reception direction of the second DMRS within the second slot. The first slot and the second slot may be the same slot, or may be different slots. For example, when the first slot and the second slot are the same slot, in this case, reception of the first DMRS within the first slot and reception of the second DMRS within the second slot may be performed in different cells. When the first slot is different from the second slot, the reception of the first DMRS within the first slot and the reception of the second DMRS within the second slot may be performed in the same cell or different cells. The difference between the reception direction of the first DMRS within the first slot and the reception direction of the second DMRS within the second slot refers to uplink transmission or downlink transmission. For example, the first DMRS within the first slot is received in a downlink manner, that is, a user terminal receives the first DMRS, and the second DMRS within the second slot is received in an uplink manner, that is, a base station receives the second DMRS. The candidate positions of the first DMRS within the first slot refers to some positions in multiple possible positions of the first DMRS, or refers to positions occupied by some of multiple patterns of the first DMRS. The position herein may refer to a relative position in a slot, that is, which time domain symbol in this slot is occupied in one slot.

For example, in the left figure of FIG. 23, a pattern of a DMRS occupies four positions, and in this case, the candidate positions of this DMRS are symbols 2, 5, 9 and 12. In FIG. 22, a pattern of a DMRS occupies two time domain symbols, and this pattern has two candidate positions, that is, symbols 4 and 5.

Candidate positions of the DMRS within the first slot at least overlap with candidate positions of the DMRS within the second slot. The main emphasis herein is positions of the first DMRS in some downlink patterns and positions of the second DMRS in some uplink pattern. For example, the first DMRS and the second DMRS both may be the front loaded DMRS. Since patterns contained by the first DMRS or the second DMRS may have a pattern of a front loaded DMRS and a pattern of a non-front loaded DMRS, the candidate positions of the first DMRS within the first slot refer to positions of some patterns of the first DMRS, but not necessarily positions of all patterns.

In an embodiment, in a case where the first DMRS is an uplink DMRS, the second DMRS is a downlink DMRS; and in a case where the first DMRS is a downlink DMRS, the second DMRS is an uplink DMRS.

In an embodiment, the candidate positions of the first DMRS within the first slot at least overlapping with the candidate positions of the second DMRS within the second slot includes: the candidate position of the first DMRS occupying r symbols within the first slot, and the candidate position of the second DMRS occupying p symbols within the second slot; where serial numbers of the r symbols within the first slot partially overlap with serial numbers of the p symbols within the second slot, and r and p are integers greater than 0.

In an embodiment, in a case where the candidate positions of the first DMRS within the first slot occupy one symbol of the first slot, the first DMRS is mapped to an n-th symbol of the first slot; and in a case where the candidate positions of the first DMRS within the first slot occupy two symbols of the first slot, the first DMRS is mapped to an n-th symbol and an m-th symbol of the first slot; where n is an integer greater than 1, and m is an integer greater than 0.

In an embodiment, n is a pre-defined fixed value, and m is a pre-defined value.

In an embodiment of the present application, in a case where the first DMRS is a downlink DMRS, the fixed value of m is (n−1), and in a case where the first DMRS is an uplink DMRS, the fixed value of m is (n+1).

In an embodiment of the present application, in a case where the first DMRS is a downlink DMRS, the value of m is (n−1), and in a case where the first DMRS is an uplink DMRS, m is equal to (n+1) or (n−1). If the uplink DMRS can be placed on the (n−1)-th symbol, m is (n−1); otherwise, m is (n+1). For example, if the (n−1)-th symbol is an uplink transmission symbol, m is (n−1).

In an embodiment, in a case where m is less than n and the first DMRS corresponds to N ports, a first port to an (N/2)-th port in the N ports are mapped to the n-th symbol of the first slot, and an (N/2+1)-th port to an N-th port in the N ports are mapped to the m-th symbol of the first slot; where, N is an even number, and serial numbers of the first port to the (N/2)-th port are less than serial numbers of the (N/2+1)-th port to the N-th port. It can ensure that the DMRS is as front as possible, facilitating the fast demodulation.

In an embodiment, in a case where a value of N is 12, the first port to the sixth port are mapped to the n-th symbol of the first slot, and the seventh port to the twelfth port are mapped to the m-th symbol.

In an embodiment of the present application, in a physical resource transport block corresponding to the first slot, in a case where the first DMRS corresponds to M ports, the M ports correspond to multiple DMRS mapping groups; where, multiple ports in the same DMRS mapping group are code-division multiplexed on multiple adjacent resource elements, the multiple ports are differentiated via OCCs, and M is an even number.

In an embodiment, in a case where the number of ports contained in a port candidate value allocated to a user terminal is less than or equal to M/2, the ports contained in the port candidate value come from different DMRS mapping groups.

In an embodiment, in a case where the number of ports contained in the port candidate value allocated to the user terminal is two, the ports contained in the port candidate value come from two different DMRS mapping groups.

In an embodiment, the multiple DMRS mapping groups correspond to different QCL assumptions.

In an embodiment, the first DMRSs are divided into multiple DMRS groups via the DMRS mapping group.

In an embodiment, for the second DMRS, reference can be made to the description of the first DMRS. For example, in a case where the second DMRS corresponds to multiple ports, multiple DMRS mapping groups can be corresponded, but features are not limited hereto.

In an embodiment, the various modules described above may be implemented by software or hardware. Implementation by hardware may, but may not necessarily, be performed in the following manner: the various modules described above are located in the same processor or located in their respective processors in any combination form.

Embodiment 6

Figure 7:
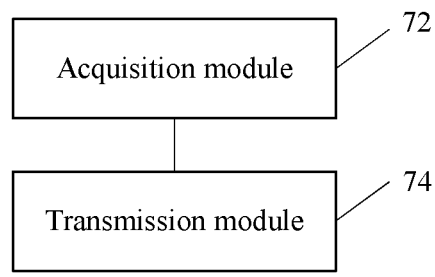
FIG. 7 is a structural block diagram of an information transmission apparatus according to an embodiment of the present application.

This embodiment of the present application further provides an information transmission apparatus. FIG. 7 is a structural block diagram of an information transmission apparatus according to an embodiment of the present application. As shown in FIG. 7, the apparatus includes an acquisition module 72 and a transmission module 74.

The acquisition module 72 is configured to acquire a multiplexing manner of multiple signals.

The transmission module 74 is connected to the acquisition module 72 and is configured to transmit the multiplexing manner of the multiple signals to a terminal via specified signaling.

Through the above apparatus, by transmitting the multiplexing manner of the multiple signals to the terminal via the specified signaling, the signaling overhead can be greatly reduced.

In an embodiment, the multiple signal may include, but is not be limited to, at least two of following signals: an uplink DMRS, a downlink DMRS, a physical uplink control channel, a CSI-RS and an uplink channel SRS.

In an embodiment, the specified signaling may include RRC signaling.

In an embodiment, the RRC signaling is configured to be high-layer signaling indicating whether PTRSs exist.

In an embodiment, the multiplexing manner may include that the multiple signals are code-division multiplexed in the time domain or that the multiple signals are not code-division multiplexed in the time domain.

In an embodiment, the above apparatus may, but is not limited to, be disposed in a network side device, such as a base station.

Embodiment 7

Figure 8:
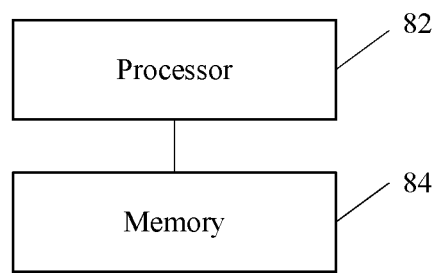
FIG. 8 is a structural block diagram of a communication node according to an embodiment 7 of the present application.
Figure 9:
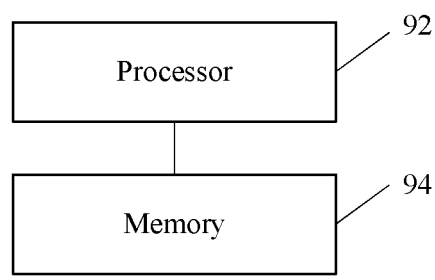
FIG. 9 is a structural block diagram of a communication node according to an embodiment of the present application.

This embodiment of the present application provides a communication node. FIG. 8 is a structural block diagram of a communication node according to an embodiment 7 of the present application. As shown in FIG. 8, The communication node includes a memory 82, a processor 84 coupled with the processor, and a computer program stored in the memory 82 and operable on the processor 84, where the processor 82, when executing the computer program, is configured to implement a following operation: transmitting a first DMRS within a first slot, where candidate positions of the first DMRS within the first slot at least overlap with candidate positions of a second DMRS within a second slot, the second slot is a slot within which a second communication node transmits the second DMRS, and a transmission direction of the first DMRS within the first slot is different from a transmission direction of the second DMRS within the second slot.

Through the above communication node, by overlapping the candidate positions of the first DMRS within the first slot and the candidate positions of the second DMRS within the second slot, the setting of the position of the DMRS is implemented. Therefore, the problem that the position of the DMRS in the slot is not set in the relate art can be solved, ensuring the effect of detecting interference between the uplink and downlink DMRSs.

In an embodiment, the communication node may be a network side device, or may be a terminal, but it is not limited thereto; and the specified communication node may be a network side device, or may be a terminal, but it is not limited thereto. In an embodiment, in a case where the communication node is a network side device, the specified communication node is a terminal, and in a case where the communication node is a terminal, the specified communication node is a network side device, which is not limited thereto. For example, in a case where the communication node is a first network side device, the specified communication node is a first terminal, and in a case where the communication node is a second terminal, the specified communication node is a second network side device. The first terminal and the second terminal may be the same or different, and the first network side device and the second network side device may be the same or different, which is not limited thereto.

In an embodiment, the first slot or the second slot may, but is not limited to, be a self-contained slot.

In an embodiment, candidate positions of the first DMRS within the first slot at least overlap with candidate positions of the second DMRS within the second slot, where the transmission direction of the first DMRS within the first slot is different from the transmission direction of the second DMRS within the second slot. The first slot and the second slot may be the same slot, or may be different slots. For example, when the first slot and the second slot are the same slot, in this case, transmission of the first DMRS within the first slot and transmission of the second DMRS within the second slot may be performed in different cells. When the first slot is different from the second slot, the transmission of the first DMRS within the first slot and the transmission of the second DMRS within the second slot may be performed in the same cell or different cells. The difference between the transmission direction of the first DMRS within the first slot and the transmission direction of the second DMRS within the second slot refers to uplink transmission or downlink transmission. For example, the first DMRS within the first slot is transmitted in a downlink manner, that is, a base station transmits the first DMRS, and the second DMRS within the second slot is transmitted in an uplink manner, that is, a user terminal transmits the second DMRS. The candidate positions of the first DMRS within the first slot refers to some positions in multiple possible positions of the first DMRS, or refers to positions occupied by some of multiple patterns of the first DMRS. The position herein may refer to a relative position in a slot, that is, which time domain symbol in this slot is occupied in one slot.

For example, in FIG. 23, a pattern (left figure) of a DMRS occupies four positions, and in this case, the candidate positions of this DMRS are symbols 2, 5, 9 and 12. In FIG. 22, a pattern of a DMRS occupies two time domain symbols, and this pattern has two candidate positions, that is, symbols 4 and 5.

Candidate positions of the DMRS within the first slot at least overlap with candidate positions of the DMRS within the second slot. The main emphasis herein is positions of the DMRS in some downlink patterns and positions of the DMRS in some uplink pattern. For example, there is the front loaded DMRS. Since patterns contained by the DMRS may have a pattern of a front loaded DMRS and a pattern of a non-front loaded DMRS, the candidate positions of the DMRS within the first slot refer to positions of some patterns of the DMRS, but not necessarily positions of all patterns.

In an embodiment, in a case where the first DMRS is an uplink DMRS, the second DMRS is a downlink DMRS, and in a case where the first DMRS is a downlink DMRS, the second DMRS is an uplink DMRS.

In an embodiment, the candidate positions of the first DMRS within the first slot overlapping with the candidate positions of the second DMRS within the second slot includes: the candidate position of the first DMRS occupying r symbols within the first slot, and the candidate position of the second DMRS occupying p symbols within the second slot; where serial numbers of the r symbols within the first slot partially overlap with serial numbers of the p symbols within the second slot, and r and p are integers greater than 0.

In an embodiment, in a case where the candidate positions of the first DMRS occupy one symbol of the first slot, the first DMRS is mapped to an n-th symbol of the first slot, and in a case where the candidate positions of the first DMRS occupy two symbols of the first slot, the first DMRS is mapped to an n-th symbol and an m-th symbol of the first slot; where n is an integer greater than 1, and m is an integer greater than 0.

In an embodiment, n is a pre-defined fixed value, and m is a pre-defined value.

In an embodiment of the present application, in a case where the first DMRS is a downlink DMRS, the fixed value of m is (n−1), and in a case where the first DMRS is an uplink DMRS, the fixed value of m is (n+1).

In an embodiment of the present application, in a case where the first DMRS is a downlink DMRS, the value of m is (n−1), and in a case where the first DMRS is an uplink DMRS, m is equal to (n+1) or (n−1). If the uplink DMRS can be placed on the (n−1)-th symbol, m is (n−1); otherwise, m is (n+1). For example, if the (n−1)-th symbol is an uplink transmission symbol, m is (n−1).

In an embodiment, in a case where m is less than n and the first DMRS corresponds to N ports, a first port to an (N/2)-th port in the N ports are mapped to the n-th symbol of the first slot, and an (N/2+1)-th port to an N-th port in the N ports are mapped to the m-th symbol of the first slot; where, N is an even number, and serial numbers of the first port to the (N/2)-th port are less than serial numbers of the (N/2+1)-th port to the N-th port. It can ensure that the DMRS is as front as possible, facilitating the fast demodulation.

In an embodiment, in a case where a value of N is 12, the first port to the sixth port are mapped to the n-th symbol of the first slot, and the seventh port to the twelfth port are mapped to the m-th symbol.

In an embodiment of the present application, in a physical resource transport block corresponding to the first slot, in a case where the first DMRS corresponds to M ports, the M ports correspond to multiple DMRS mapping groups; where, multiple ports in the same DMRS mapping group are code-division multiplexed on multiple adjacent resource elements, the multiple ports are differentiated via OCCs, and M is an even number.

In an embodiment, in a case where the number of ports contained in a port candidate value allocated to a user terminal is less than or equal to M/2, the ports contained in the port candidate value come from different DMRS mapping groups.

In an embodiment, in a case where the number of ports contained in the port candidate value allocated to the user terminal is two, the ports contained in the port candidate value come from two different DMRS mapping groups.

In an embodiment, the multiple DMRS mapping groups correspond to different QCL assumptions.

In an embodiment, the first DMRSs are divided into multiple DMRS groups via the DMRS mapping group.

In an embodiment, for the second DMRS, reference can be made to the description of the first DMRS. For example, in a case where the second DMRS corresponds to multiple ports, multiple DMRS mapping groups can be corresponded, but features are not limited hereto.

Embodiment 8

The present application provides a communication node. The communication node includes a memory, a processor coupled with the processor, and a computer program stored in the memory and operable on the processor, where the processor, when executing the computer program, is configured to implement following operations: receiving first information within a first slot, where the first information includes a data channel and a first demodulation reference signal; and demodulating the data channel according to the first demodulation reference signal; where, candidate positions of the first demodulation reference signal within the first slot at least overlap with candidate positions of a second demodulation reference signal within a second slot, the second slot is a slot within which a specified communication node receives second information, the second information includes the second demodulation reference signal, and a reception direction of the first demodulation reference signal within the first slot is different from a reception direction of the second demodulation reference signal within the second slot.

Through the above apparatus, by at least overlapping the candidate positions of the first DMRS within the first slot and the candidate positions of the second DMRS within the second slot, the setting of the position of the DMRS is implemented. Therefore, the problem that the position of the DMRS in the slot is not set in the relate art can be solved, ensuring the effect of detecting interference between the uplink and downlink DMRSs.

In an embodiment, the communication node may be a network side device, or may be a terminal, but it is not limited thereto; and the specified communication node may be a network side device, or may be a terminal, but it is not limited thereto. In an embodiment, in a case where the communication node is a network side device, the specified communication node is a terminal, and in a case where the communication node is a terminal, the specified communication node is a network side device, which is not limited thereto. For example, in a case where the communication node is a network side device and the specified communication node is a terminal, the first information may be information sent by a first terminal and received by a first network side device, and the second information may be information sent by a second network side device and received by a second terminal. The first terminal and the second terminal may be different, and the first network side device and the second network side device may be different, which is not limited thereto.

In an embodiment, the first slot or the second slot may, but is not limited to, be a self-contained slot.

In an embodiment, candidate positions of the first DMRS within the first slot at least overlap with candidate positions of the second DMRS within the second slot, where the reception direction of the first DMRS within the first slot is different from the reception direction of the second DMRS within the second slot. The first slot and the second slot may be the same slot, or may be different slots. For example, when the first slot and the second slot are the same slot, in this case, reception of the first DMRS within the first slot and reception of the second DMRS within the second slot may be performed in different cells. When the first slot is different from the second slot, the reception of the first DMRS within the first slot and the reception of the second DMRS within the second slot may be performed in the same cell or different cells. The difference between the reception direction of the first DMRS within the first slot and the reception direction of the second DMRS within the second slot refers to uplink transmission or downlink transmission. For example, the first DMRS within the first slot is received in a downlink manner, that is, a user terminal receives the first DMRS, and the second DMRS within the second slot is received in an uplink manner, that is, a base station receives the second DMRS. The candidate positions of the first DMRS within the first slot refers to some positions in multiple possible positions of the first DMRS, or refers to positions occupied by some of multiple patterns of the first DMRS. The position herein may refer to a relative position in a slot, that is, which time domain symbol in this slot is occupied in one slot.

For example, in FIG. 23, a pattern (left figure) of a DMRS occupies four positions, and in this case, the candidate positions of this DMRS are symbols 2, 5, 9 and 12. In FIG. 22, a pattern of a DMRS occupies two time domain symbols, and this pattern has two candidate positions, that is, symbols 4 and 5.

Candidate positions of the DMRS within the first slot at least overlap with candidate positions of the DMRS within the second slot. The main emphasis herein is positions of the first DMRS in some downlink patterns and positions of the second DMRS in some uplink pattern. For example, the first DMRS and the second DMRS both may be the front loaded DMRS. Since patterns contained by the first DMRS or the second DMRS may have a pattern of a front loaded DMRS and a pattern of a non-front loaded DMRS, the candidate positions of the first DMRS within the first slot refer to positions of some patterns of the first DMRS, but not necessarily positions of all patterns.

In an embodiment, in a case where the first DMRS is an uplink DMRS, the second DMRS is a downlink DMRS, and in a case where the first DMRS is a downlink DMRS, the second DMRS is an uplink DMRS.

In an embodiment, the candidate positions of the first DMRS within the first slot overlapping with the candidate positions of the second DMRS within the second slot includes: the first DMRS occupying r symbols within the first slot, and the second DMRS occupying p symbols within the second slot; where serial numbers of the r symbols within the first slot at least partially overlap with serial numbers of the p symbols within the second slot, and r and p are integers greater than 0.

In an embodiment, in a case where the candidate positions of the first DMRS within the first slot occupy one symbol of the first slot, the first DMRS is mapped to an n-th symbol of the first slot, and in a case where the candidate positions of the first DMRS within the first slot occupy two symbols of the first slot, the first DMRS is mapped to an n-th symbol and an m-th symbol of the first slot; where n is an integer greater than 1, and m is an integer greater than 0.

In an embodiment, n is a pre-defined fixed value, and m is a pre-defined value.

In an embodiment of the present application, in a case where the first DMRS is a downlink DMRS, the fixed value of m is (n−1), and in a case where the first DMRS is an uplink DMRS, the fixed value of m is (n+1).

In an embodiment of the present application, in a case where the first DMRS is a downlink DMRS, the value of m is (n−1), and in a case where the first DMRS is an uplink DMRS, m is equal to (n+1) or (n−1). If the uplink DMRS can be placed on the (n−1)-th symbol, m is (n−1); otherwise, m is (n+1). For example, if the (n−1)-th symbol is an uplink transmission symbol, m is (n−1).

In an embodiment, in a case where m is less than n and the first DMRS corresponds to N ports, a first port to an (N/2)-th port in the N ports are mapped to the n-th symbol of the first slot, and an (N/2+1)-th port to an N-th port in the N ports are mapped to the m-th symbol of the first slot; where, N is an even number, and serial numbers of the first port to the (N/2)-th port are less than serial numbers of the (N/2+1)-th port to the N-th port. It can ensure that the DMRS is as front as possible, facilitating the fast demodulation.

In an embodiment, in a case where a value of N is 12, the first port to the sixth port are mapped to the n-th symbol of the first slot, and the seventh port to the twelfth port are mapped to the m-th symbol.

In an embodiment of the present application, in a physical resource transport block corresponding to the first slot, in a case where the first DMRS corresponds to M ports, the M ports correspond to multiple DMRS mapping groups; where, multiple ports in the same DMRS mapping group are code-division multiplexed on multiple adjacent resource elements, the multiple ports are differentiated via OCCs, and M is an even number.

In an embodiment, in a case where the number of ports contained in a port candidate value allocated to a user terminal is less than or equal to M/2, the ports contained in the port candidate value come from different DMRS mapping groups.

In an embodiment, in a case where the number of ports contained in the port candidate value allocated to the user terminal is two, the ports contained in the port candidate value come from two different DMRS mapping groups.

In an embodiment, the multiple DMRS mapping groups correspond to different QCL assumptions.

In an embodiment, the first DMRSs are divided into multiple DMRS groups via the DMRS mapping group.

In an embodiment, for the second DMRS, reference can be made to the description of the first DMRS. For example, in a case where the second DMRS corresponds to multiple ports, multiple DMRS mapping groups can be corresponded, but features are not limited hereto.

Embodiment 9

Figure 10:
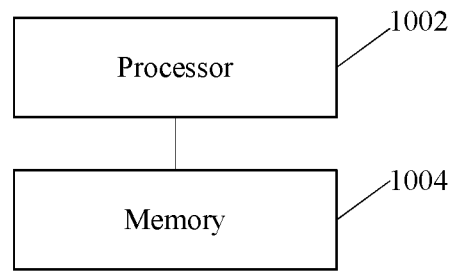
FIG. 10 is a structural block diagram of a network side device according to an embodiment of the present application.

This embodiment of the present application further provides a network side device. FIG. 10 is a structural block diagram of a network side device according to an embodiment of the present application. As shown in FIG. 10, the network side device includes a processor 1002 and a memory 1004.

The network side device includes the processor 1002, the memory 1004 coupled with the processor, and a computer program stored in the memory 1004 and operable on the processor 1002. The processor 1002, when executing the computer program, is configured to implement following operations: acquiring a multiplexing manner of multiple of signals, and transmitting the multiplexing manner of the multiple signals to a terminal via specified signaling.

Through the above network side device, by transmitting the multiplexing manner of the multiple signals to the terminal via the specified signaling, the signaling overhead can be greatly reduced.

In an embodiment, the multiple signal may include, but is not be limited to, at least two of following signals: an uplink DMRS, a downlink DMRS, a physical uplink control channel, a CSI-RS and an uplink channel SRS.

In an embodiment, the specified signaling may include RRC signaling.

In an embodiment, the RRC signaling is configured to be high-layer signaling indicating whether PTRSs exist.

In an embodiment, the multiplexing manner may include that the multiple signals are code-division multiplexed in the time domain or that the multiple signals are not code-division multiplexed in the time domain.

Embodiment 10

This embodiment of the present application further provides a storage medium. The storage medium includes stored programs which, when executed, execute the method of any one of the embodiments described above.

In this embodiment, the storage medium may include, but is not limited to, a USB flash disk, a read-only memory (ROM), a random access memory (RAM), a mobile hard disk, a magnetic disk, an optical disk or another medium capable of storing program codes.

An embodiment of the present application further provides a processor. The processor is configured to execute programs which, when executed on the processor, execute the method of any one of the embodiments described above.

For examples in the embodiment, reference may be made to the examples described in the above embodiments and implementation modes, and the examples will not be repeated in the embodiment.

For a better understanding of the embodiments of the present application, the present application is described in detail in conjunction with application embodiments.

Application Embodiment 1

For uplink and downlink DMRS, at least one symbol is overlapped.

If a DMRS occupies one symbol, the DMRS is mapped on a pre-defined symbol n; and if a DMRS occupies two symbols, the DMRS is mapped on the n-th and the m-th symbols.

M is variable, and the m-th symbol is a first symbol different from the n-th symbol in a data transmission channel of a user.

In an embodiment, for downlink, candidate values of m include (n−1); and for uplink, m is equal to (n+1).

In an embodiment, for downlink, candidate values of m include (n−1); and for uplink, m is variable, and the m-th symbol is a first symbol different from the n-th symbol in the data transmission channel of the user.

The former part of ports of the DMRS is mapped on the n-th symbol, and the latter part of ports of the DMRS is mapped on the m-th symbol, where m<n.

The first to sixth ports of the DMRS are mapped on the n-th symbol, and the seventh to twelfth ports of the DMRS are mapped on the m-th symbol, where m<n. Candidate values of m at least include (n−1).

Figure 11:
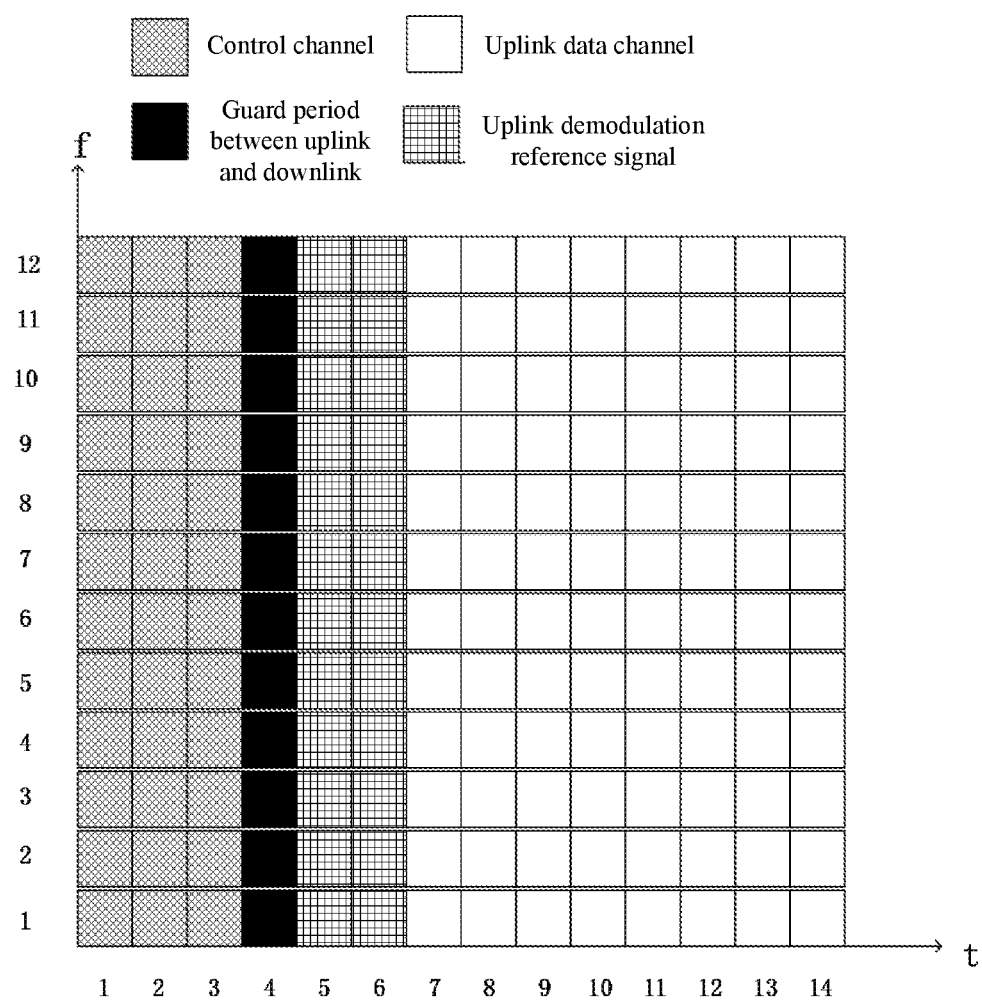
FIG. 11 is a structural diagram one of a slot according to an application embodiment 1 of the present application.

For the DMRS design, another demand is an uplink and downlink symmetric design. If different cells have different transmission directions, the DMRS can also be ensured to be at the same position. For example, the transmission direction of a cell 1 is downlink, the transmission direction of an adjacent cell 2 is uplink, and such a symmetric design is beneficial to reducing mutual interference between the uplink and the downlink. In an embodiment, for an uplink slot structure, if there is a control channel, the control channel and a scheduled uplink data area at least have one symbol serving for a guard period (GP). FIG. 11 is a structural diagram one of a slot according to an application embodiment 1 of the present application. As shown in FIG. 11, assuming that the control channel occupies three time domain symbols at most and one symbol is used for the GP, the position of a front loaded DMRS of the uplink data is preferably fixed on the fifth and sixth symbols.

In this case, in order to acquire the uplink and downlink symmetric design, a downlink front loaded DMRS should also be fixed on the fifth and sixth symbols, even if there is no GP between a downlink data area and the control channel.

Generally, due to a strong capability of a base station, even if the position of the of the uplink front loaded DMRS is fixed on the fifth and sixth symbols, the base station can detect the DMRS quickly and complete data scheduling. However, since the capability of the user is weak, it is required that the last time domain symbol of the downlink front loaded DMRS cannot be too close to the last position, but the symbol 6 seems to be too close to the last position.

For the position design of the downlink front loaded DMRS, there may be a manner:

if the DMRS occupies one symbol, the DMRS is mapped on the n-th symbol; and if the DMRS occupies two symbols, the DMRS is mapped on the n-th and the m-th symbols, where m=(n−1).

For example, if the base station allocates one time domain symbol for the downlink front loaded DMRS, the DMRS is fixed on the fifth time domain symbol, and if the base station allocates two time domain symbols for the downlink front loaded DMRS, the DMRS is fixed on the fifth and fourth time domain symbols.

In an embodiment, for the downlink, if the DMRS occupies one symbol, the DMRS is mapped on the n-th symbol; and if the DMRS occupies two symbols, the DMRS is mapped on the n-th and the (n−1)-th symbols. For the uplink, if the DMRS occupies one symbol, the DMRS is mapped on the n-th symbol; and if the DMRS occupies two symbols, the DMRS is mapped on the n-th and the m-th symbols. In this case, m=(n+1).

Generally, since the uplink needs a fewer number of DMRS ports, that is, the uplink needs one time domain symbol (that is, the symbol 5) at most for the front loaded DMRS, in this case, the sixth time domain symbol in FIG. 11 is used for uplink data transmission. In order to ensure the uplink and downlink symmetric design, the downlink front loaded DMRS only needs to have one symbol on the symbol 5. If there are two time domain symbols for the downlink front loaded DMRS, the front loaded DMRS can be mapped on the symbol 5 and the symbol 4.

If the uplink also needs two symbols for the DMRS, the uplink front loaded DMRS can be only mapped on the fifth and the sixth symbols. In this case, for the downlink front loaded DMRS, the downlink front loaded DMRS is mapped on the symbol 5 with only one time domain symbol. If there are two time domain symbols for the downlink front loaded DMRS, the front loaded DMRS is mapped on the symbol 5 and the symbol 4.

Figure 12:
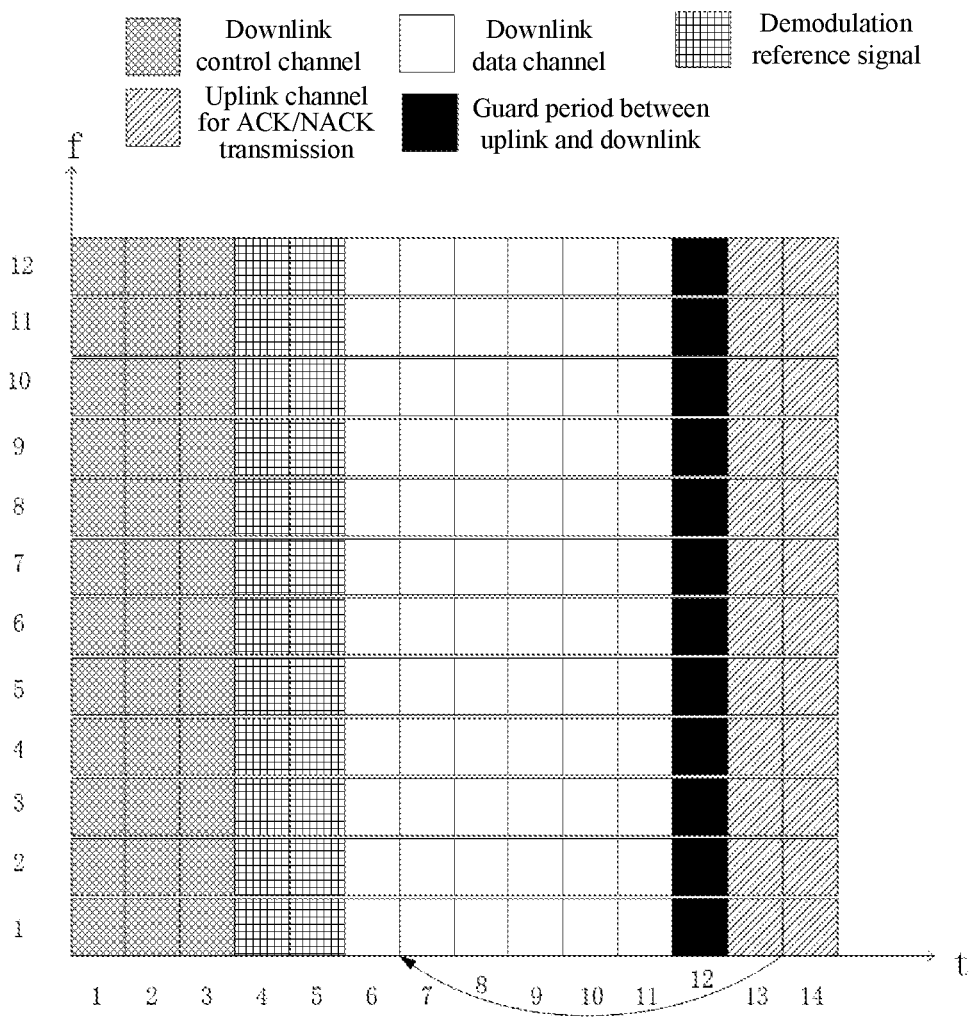
FIG. 12 is a structural diagram two of a slot according to an application embodiment 1 of the present application.

FIG. 12 is a structural diagram two of a slot according to an application embodiment 1 of the present application. As shown in FIG. 12, it ensures that at least one time domain symbol is mapped on the symbol 5, ensuring the detection of interference between uplink and downlink DMRSs.

Comparing FIG. 11 and FIG. 12, it can be seen that for uplink and downlink front loaded DMRSs, at least one symbol is overlapped.

Figure 13:
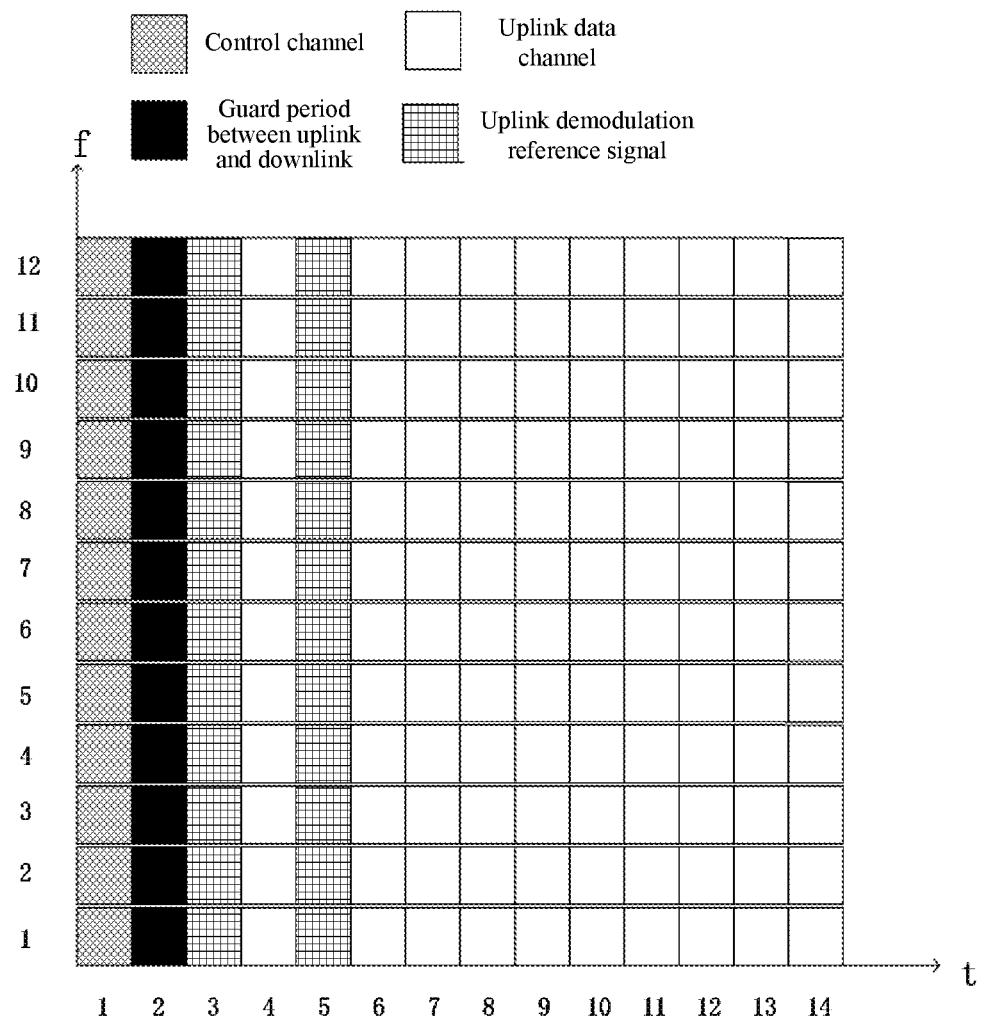
FIG. 13 is a structural diagram three of a slot according to an application embodiment of the present application.

If the control channel for scheduling the uplink data transmission does not occupy three symbols, for example, the control channel occupies one time domain symbol, in this case, if the uplink DMRS occupies two symbols, one DMRS is fixed on the fifth time domain symbol, and the other is not necessarily fixed on the sixth symbol and can be placed on the first symbol of the uplink data area. That is, for the downlink, if the DMRS occupies one symbol, the DMRS is mapped on the n-th symbol; and if the DMRS occupies two symbols, the DMRS is mapped on the n-th and the (n−1)-th symbols. For the uplink, if the DMRS occupies one symbol, the DMRS is mapped on the n-th symbol; and if the DMRS occupies two symbols, the DMRS is mapped on the n-th and the m-th symbols. M is variable, and the m-th symbol is a first symbol different from the n-th symbol in the uplink transmission channel of the user. FIG. 13 is a structural diagram three of a slot according to an application embodiment of the present application. As shown in FIG. 13, assuming that the base station allocates the third to fourteenth time domain symbols to the uplink transmission area of the user, in this case, the first time domain symbol of the uplink transmission area is the symbol 3, that is, a front loaded DMRS capable of being used on the second symbol.

In other words, for the uplink front loaded DMRS, if one symbol is occupied, the uplink front loaded DEMRS is mapped on the fixed n-th time domain symbol, and if two symbols are occupied, one symbol of the front loaded DMRS is fixed on the n-th time domain symbol, and the time domain position of the other symbol of the DMRS is variable and is the first symbol other than the n-th symbol in the allocated data transmission area. This manner is also suitable for the transmission of the downlink DMRS.

In another example, if there is no control channel in a slot, the base station allocates the first to fourteenth symbols to the data channel of the user, in this case, one symbol of the front loaded DMRS is fixed on the fifth time domain symbol, and the other symbol is placed on the first symbol of the data channel, that is, the symbol 1.

The time domain position where the former part of ports of the DMRS is mapped is behind the time domain position where the latter part of ports of the DMRS is mapped.

Figure 14:
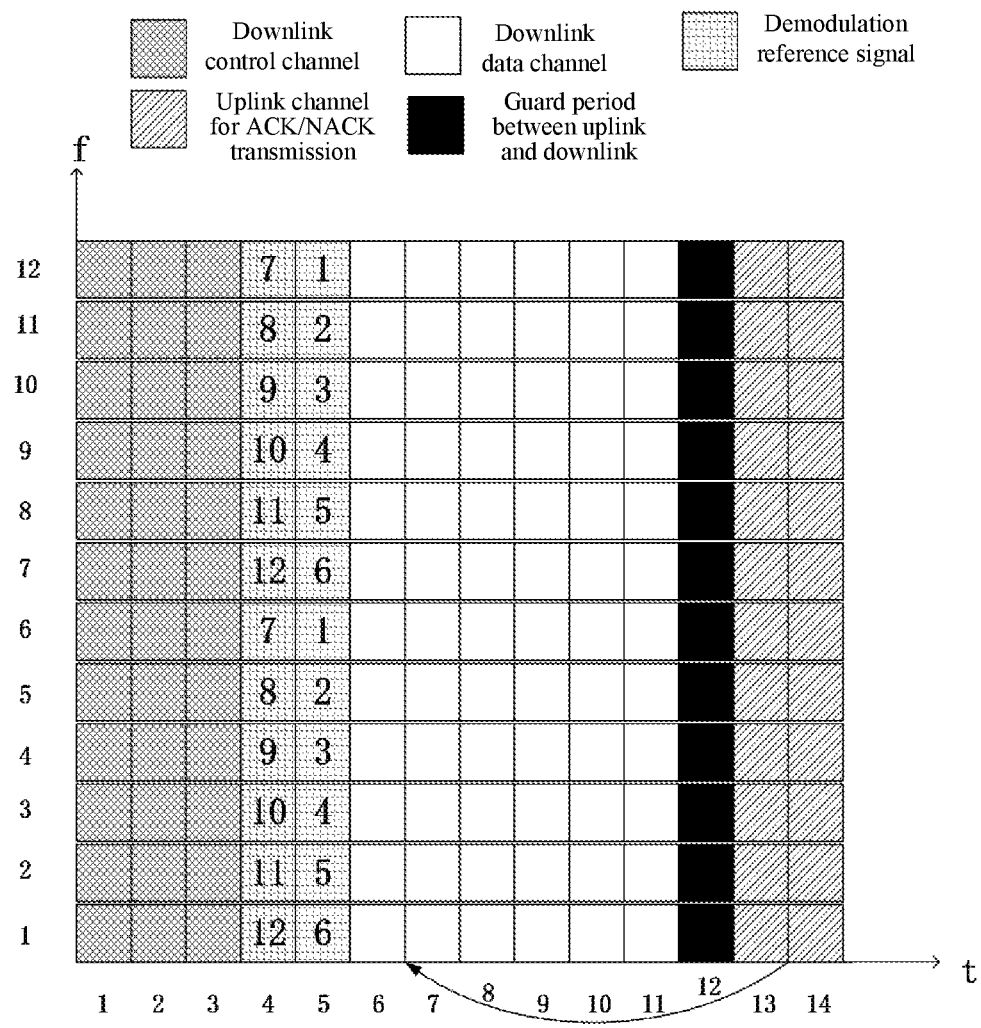
FIG. 14 is a structural diagram four of a slot according to an application embodiment 1 of the present application.

In an embodiment, for the downlink, if the DMRS occupies one symbol, the DMRS is mapped on the n-th symbol; and if the DMRS occupies two symbols, the DMRS is mapped on the n-th and the (n−1)-th symbols. In DMRS port mapping, the former part of ports of the DMRS is mapped on the n-th time domain symbol, and the latter part of ports is mapped on the m-th time domain symbol, where m is less than n. For example, FIG. 14 is a structural diagram four of a slot according to an application embodiment 1 of the present application. As shown in FIG. 14, for a DMRS pattern supporting 12 ports at most, ports 1 to 6 are on the symbol 5, and ports 7 to 12 are on the fourth symbol. In other words, the first to sixth ports of the DMRS are mapped on the n-th symbol, and the seventh to twelfth ports are mapped on the (n−1)-th symbol, where n=5. In an embodiment, the first to sixth ports of the DMRS are mapped on the n-th symbol, and the seventh to twelfth ports are mapped on the (n−1)-th symbol, where n=4, that is, the first to sixth ports of the DMRS are mapped on the fourth symbol, and the seventh to twelfth ports are mapped on the third symbol.

Figure 15:
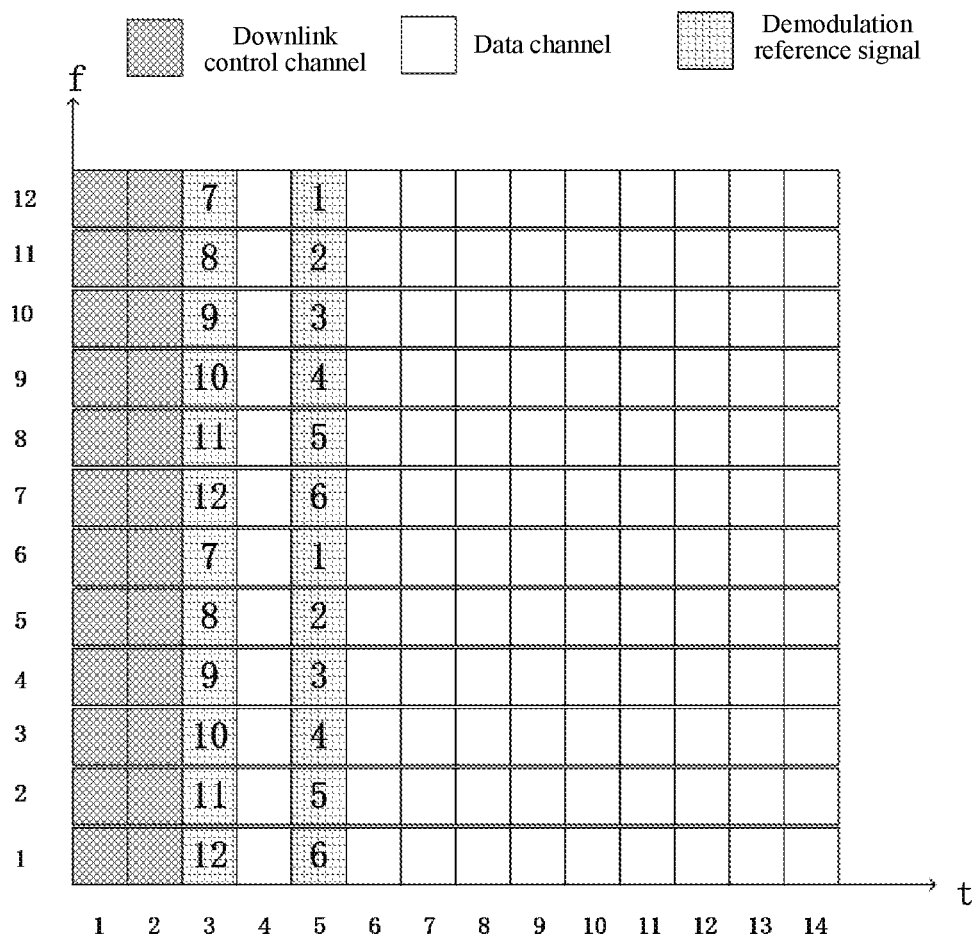
FIG. 15 is a structural diagram five of a slot according to an application embodiment of the present application.

The first to sixth ports of the DMRS are mapped on the n-th symbol, and the seventh to twelfth ports of the DMRS are mapped on the m-th symbol, where m<n. If m=(n−2), the mapping is as shown in FIG. 15. FIG. 15 is a structural diagram of a slot according to an application embodiment of the present application.

Application Embodiment 2

Figure 16:
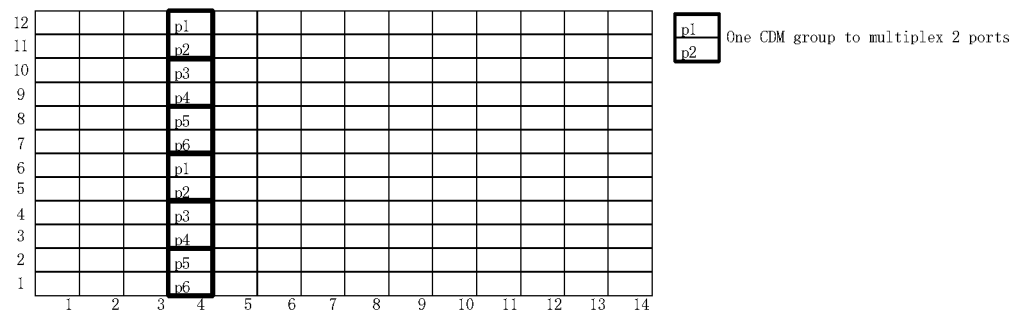
FIG. 16 is a structural diagram of a slot according to an application embodiment of the present application.

FIG. 16 is a structural diagram of a slot according to an application embodiment of the present application. As shown in FIG. 16, in one physical resource transport block, if only one OFDM symbol is used for the transmission of the DMRS, six DMRS ports at most are supported. In the pattern of the DMRS, ports p1 and p2 are a mapping group, are code-division multiplexed on two adjacent resource elements (REs) in the frequency domain, and are differentiated with different OCC serial numbers, for example, the port p1 is differentiated with an OCC serial number [1, 1] and the port p2 is differentiated with an OCC serial number [1, −1]; ports p3 and p4 are a mapping group, are code-division multiplexed on two adjacent REs in the frequency domain, and are differentiated with different OCC serial numbers, for example, the port p3 is differentiated with an OCC serial number [1, 1] and the port p4 is differentiated with an OCC serial number [1, −1]; ports p5 and p6 are a mapping group, are code-division multiplexed on two adjacent REs in the frequency domain, and are differentiated with different OCC serial numbers, for example, the port p1 is differentiated with an OCC serial number [1, 1] and the port p2 is differentiated with an OCC serial number [1, −1].

A DMRS port candidate value allocated to a user contains as many DMRS mapping groups as possible.

If the base station allocates two data layers to a user, that is, two DMRS ports, the two DMRS ports allocated to the user belong to different mapping groups. If the base station allocates three data layers to a user, that is, three DMRS ports, the three DMRS ports allocated to the user belong to different mapping groups.

If the base station allocates four data layers to a user, that is, four DMRS ports, in the four DMRS ports allocated to the user, only two ports belong to the same mapping group, and the other two ports belong to different other mapping groups.

According to a mapping relationship of the port to the resource in FIG. 16, power per port relative to data is increased by three times. FIG. 16 shows a mapping figure of six ports, but in fact, the base station can allocate less than six ports to the user.

For a user of rank 2, two DMRS ports are allocated to the user, and these two DMRS ports belong to different mapping groups respectively. For example, the two allocated ports may be (p1, p3), (p2, p5) or (p4, p6); and in another example, the two allocated ports may be (p1, p4), (p2, p6) or (p3, p5). If the two ports allocated to the user is (p #1, p #2), (p #3, p #4) or (p #5, p #6), two ports of the user, such as ports p1 and p2, would be code-division multiplexed in the same time domain resource, which will cause inter-code interference, and in multi-base station transmission, since DMRSs and data layers corresponding to ports p1 and p2 may come from different base stations, the QCL relationship is also different, that is, time-frequency synchronization is different. In such a way, the user cannot perfectly demodulate inter-layer interference, thereby reducing accuracy of channel estimation. However, if DMRS ports allocated to the user are ports p1 and p3, since ports p1 and p3 are frequency-division multiplexed, the above situation does not exist. Since two ports allocated to the user of rank 2 belong to different DMRS mapping groups, different DMRS mapping groups can implicitly correspond to different QCL assumptions.

For a user of rank 3, possible ports are (p1, p3, p5) or (p2, p4, p6). For example, the ports are ports p1, p3 and p5, since these ports come from different DMRS mapping groups and are not code-division multiplexed, the channel estimation is better.

for a user of rank 4, that is, if the base station allocates four data layers to a user, that is, four DMRS ports, in the four DMRS ports allocated to the user, only two ports belong to the same mapping group, and the other two ports belong to different other mapping groups. For example, the four allocated ports may be (p1, p2, p3, p5), where p1 and p2 are a mapping group, and p3 and p5 belong to different DMRS mapping groups respectively. Of course, there may be other candidate ports, such as (p1, p3, p4, p5) or (p2, p4, p5, p6). Since one symbol has only there DMRS groups, the user of rank 4 occupies three DMRS mapping groups at most.

Figures 17, 18, 19:
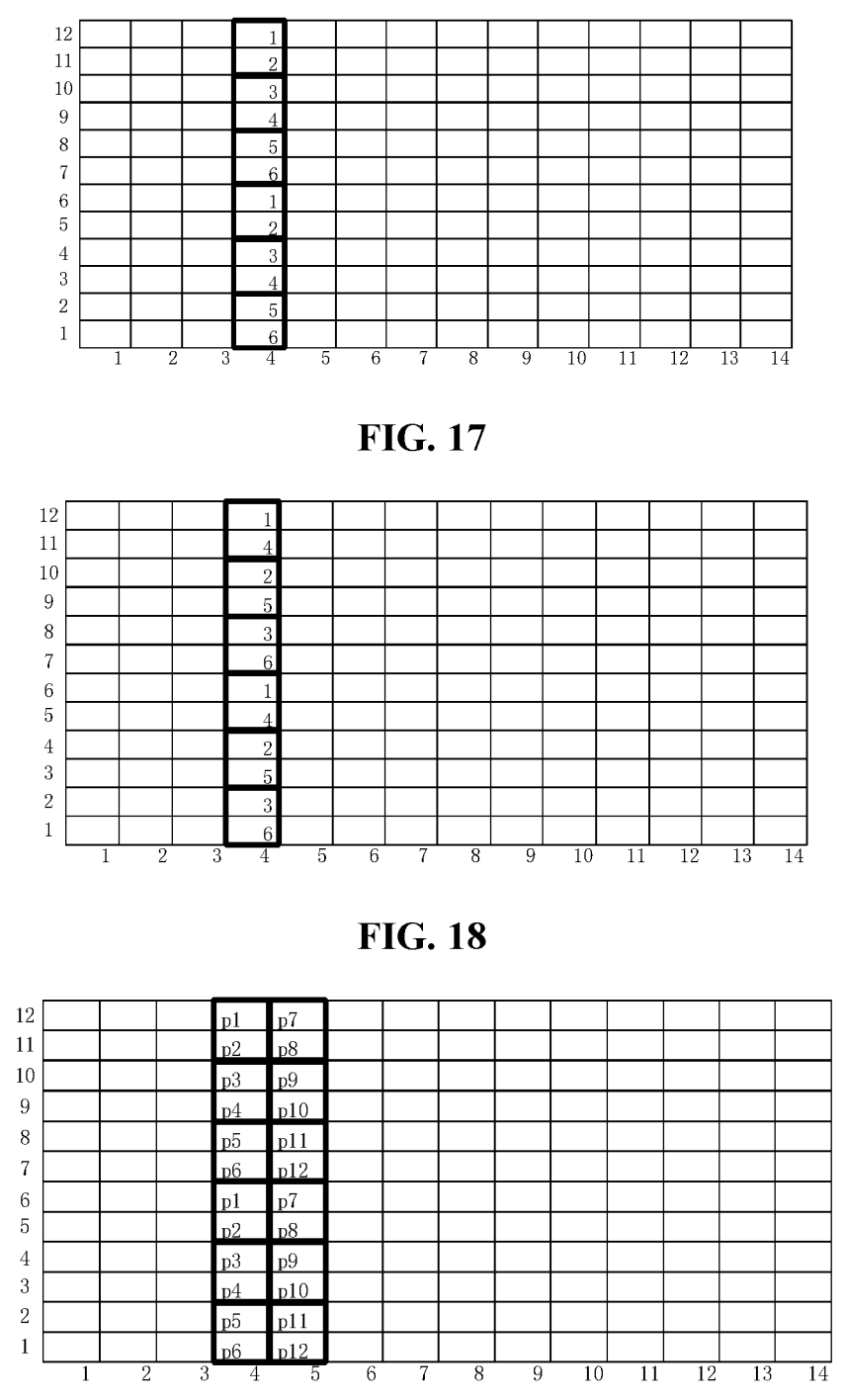

In an embodiment, p1 to p6 are different integers and can represent different numbers. For example, p1 to p6 are equal to 1, 2, 3, 4, 5 and 6 respectively. Therefore, the mapped DMRS patter is as shown in FIG. 17, and FIG. 17 is a schematic diagram of a pattern of a mapped DMRS according to an application embodiment 2 of the present application. In another example, p1 to p6 are equal to 1, 4, 2, 5, 3 and 6 respectively, and the mapping of the DMRS port to the resource is as shown in FIG. 18. FIG. 18 is a schematic diagram of a mapping of a DMRS port to a resource according to an application embodiment of the present application. Ports 1 and 4 belong to a DMRS mapping group, are code-division multiplexed on two REs in the frequency domain, and are differentiated with different OCC serial numbers, for example, the port p1 is differentiated with an OCC serial number [1, 1] and the port p4 is differentiated with an OCC serial number [1, −1] or the port p1 is differentiated with an OCC serial number [1, −1] and the port p4 is differentiated with an OCC serial number [1, 1]; ports 2 and 5 belong to a DMRS mapping group, are code-division multiplexed on two adjacent REs in the frequency domain, and are differentiated with different OCC serial numbers, for example, the port p2 is differentiated with an OCC serial number [1, 1] and the port p5 is differentiated with an OCC serial number [1, −1], or the port p2 is differentiated with an OCC serial number [1, −1] and the port p5 is differentiated with an OCC serial number [1, 1]; ports 3 and 6 belong to a DMRS mapping group, are code-division multiplexed on two adjacent REs in the frequency domain, and are differentiated with different OCC serial numbers, for example, the port p3 is differentiated with an OCC serial number [1, 1] and the port p6 is differentiated with an OCC serial number [1, −1], or the port p3 is differentiated with an OCC serial number [1, −1] and the port p6 is differentiated with an OCC serial number [1, 1].

Application Embodiment 3

FIG. 19 is a schematic diagram of a DMRS port mapping according to an application embodiment 3 of the present application. As shown in FIG. 19, in one physical resource transport block, if two OFDM symbols are used for the transmission of the DMRS, 12 DMRS ports at most are supported. In the pattern of the DMRS, ports p1 and p2 are a mapping group, are coded divided on two adjacent REs in the frequency domain, and are differentiated with different OCC serial numbers, for example, the port p1 is differentiated with an OCC serial number [1, 1] and the port p2 is differentiated with an OCC serial number [1, −1], or the port p1 is differentiated with an OCC serial number [1, −1] and the port p2 is differentiated with an OCC serial number [1, 1]. Ports p3 and p4 are a mapping group, are coded divided on two adjacent REs in the frequency domain, and are differentiated with different OCC serial numbers, for example, the port p3 is differentiated with an OCC serial number [1, 1] and the port p4 is differentiated with an OCC serial number [1, −1], or the port p3 is differentiated with an OCC serial number [1, −1] and the port p4 is differentiated with an OCC serial number [1, 1]. Ports p5 and p6 are a mapping group, are coded divided on two adjacent REs in the frequency domain, and are differentiated with different OCC serial numbers, for example, the port p5 is differentiated with an OCC serial number [1, 1] and the port p6 is differentiated with an OCC serial number [1, −1], or the port p5 is differentiated with an OCC serial number [1, −1] and the port p6 is differentiated with an OCC serial number [1, 1]. Ports p7 and p8 are a mapping group, are coded divided on two adjacent REs in the frequency domain, and are differentiated with different OCC serial numbers, for example, the port p7 is differentiated with an OCC serial number [1, 1] and the port p8 is differentiated with an OCC serial number [1, −1], or the port p7 is differentiated with an OCC serial number [1, −1] and the port p8 is differentiated with an OCC serial number [1, 1]. Ports p9 and p10 are a mapping group, are coded divided on two adjacent REs in the frequency domain, and are differentiated with different OCC serial numbers, for example, the port p9 is differentiated with an OCC serial number [1, 1] and the port p10 is differentiated with an OCC serial number [1, −1], or the port p9 is differentiated with an OCC serial number [1, −1] and the port p10 is differentiated with an OCC serial number [1, 1]. Ports p11 and p12 are a mapping group, are coded divided on two adjacent REs in the frequency domain, and are differentiated with different OCC serial numbers, for example, the port p11 is differentiated with an OCC serial number [1, 1] and the port p12 is differentiated with an OCC serial number [1, −1], or the port p11 is differentiated with an OCC serial number [1, −1] and the port p12 is differentiated with an OCC serial number [1, 1].

The DMRS port candidate value allocated to a user contains as many DMRS mapping groups as possible.

Similarly, in the DMRS port candidate value allocated to a user contains, if the port quantity is less than or equal to 7, the allocated ports come from different DMRS mapping groups. Alternatively, there is one of following cases.

If the base station allocates two data layers to a user, that is, two DMRS ports, the two DMRS ports allocated to the user belong to different mapping groups.

If the base station allocates three data layers to a user, that is, three DMRS ports, the three DMRS ports allocated to the user belong to different mapping groups. For example, the user can be allocated ports (p1, p3, p'7), (p2, p4, p8) or (p1, p3, p5).

If the base station allocates four data layers to a user, that is, four DMRS ports, the four DMRS ports allocated to the user belong to different mapping groups. For example, the user can be allocated ports (p1, p3, p7, p9) or (p2, p4, p8, p10). The advantage of selecting ports (p1, p3, p'7, p9) or (p2, p4, p8, p10) is that the DMRS ports on the two OFDM symbols of the user are balanced and the transmit power is balanced.

If the base station allocates five data layers to a user, that is, five DMRS ports, the five DMRS ports allocated to the user belong to different mapping groups. For example, the user can be allocated ports (p1, p3, p5, p7, p9) or (p2, p4, p6, p8, p10).

If the base station allocates six data layers to a user, that is, six DMRS ports, the six DMRS ports allocated to the user belong to different mapping groups. For example, the user can be allocated ports (p1, p3, p5, p7, p9, p11) or (p2, p4, p6, p8, p10, p12).

In an embodiment, this pattern can support 12 ports at most, and the above examples indicate that a user is allocated less than 12 ports, and the remaining ports may be or may not be occupied by other users.

Figures 20, 21:
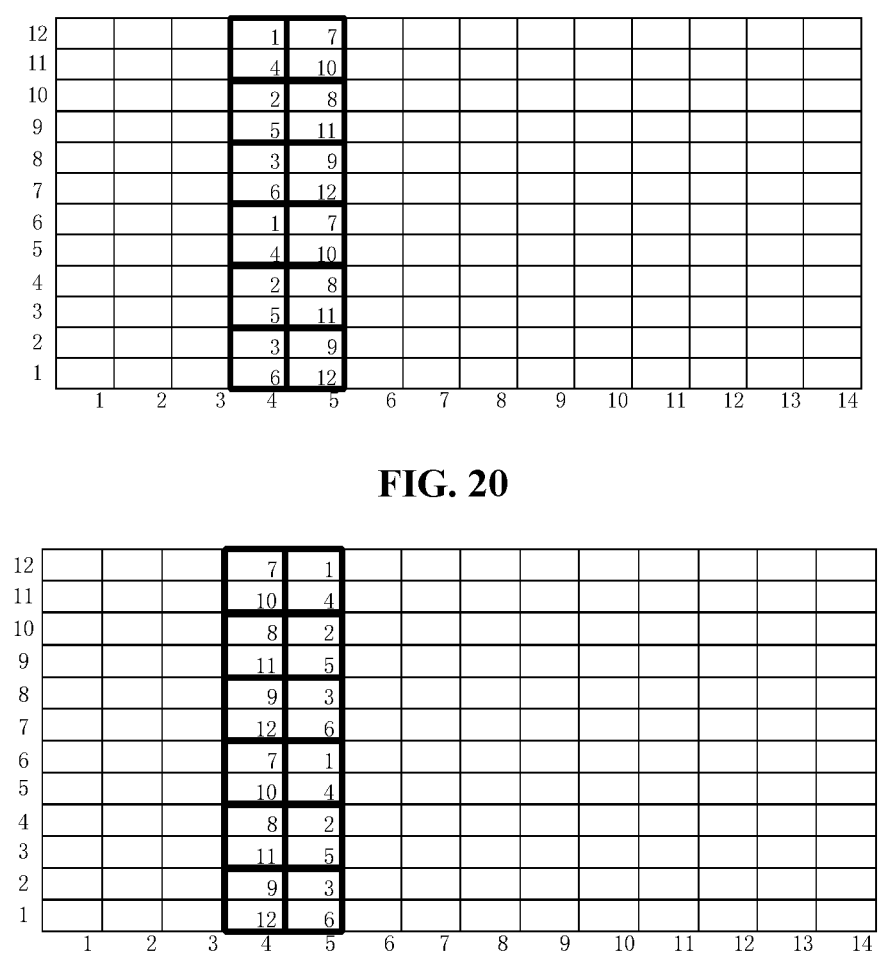

In an embodiment, p1 to p12 are different integers and can represent different numbers. For example, p1 to p12 are equal to 1, 4, 2, 5, 3, 6, 7, 10, 8, 11, 9 and 12 respectively, and the mapping of the DMRS port to the resource is as shown in FIG. 20. FIG. 20 is a schematic diagram of a mapping of a DMRS port to a resource according to an application embodiment 3 of the present application. The advantage of such a mapping manner is that when the total DMRS port quantity is less than 12, for example, 10, the DMRS ports occupy as many different DMRS mapping groups as possible.

In conjunction with the application point in the application embodiment 1, the former part of ports of the DMRS is mapped on the n-th symbol, and the latter part of ports of the DMRS is mapped on the m-th symbol, where m<n.

The first to sixth ports of the DMRS are mapped on the n-th symbol, and the seventh to twelfth ports of the DMRS are mapped on the m-th symbol, where m<n. The candidate values of m at least include (n−1). The DMRS patter of 12 ports is as shown in FIG. 21, and FIG. 21 is a schematic diagram of a DMRS pattern of 12 ports according to an application embodiment 3 of the present application.

Application Embodiment 4

In the above case where two OFDM symbols are used for the DMRS, different ports use time division multiplexing (TDM) on time domain symbols, that is, DMRS ports on different OFDM symbols occupy different time-frequency resources. If OCC codes are used to multiplex different DMRS ports in the time domain, one DMRS mapping group contains four DMRS ports. FIG. 22 is a schematic diagram of a mapping of a port to a resource according to an application embodiment 4 of the present application. In this case, ports p1, p2, p7 and p8 in a first port mapping group are coded divided on four adjacent REs, that is, p1, p2, p7 and p8 occupy four REs that are the same, but use different OCC serial numbers, for example, p1, p2, p7 and p8 use OCC serial numbers [1, 1, 1, 1], [1, −1, 1, −1], [1, 1, −1, −1] and [1, −1, −1, 1] respectively. Similarly, ports p3, p4, p9 and p10 in a second port mapping group are coded divided on four adjacent REs, for example, p3, p4, p9 and p10 use OCC serial numbers [1, 1, 1, 1], [1, −1, 1, −1], [1, 1, −1, −1] and [1, −1, −1, 1] respectively; ports p5, p6, p11 and p12 in a third port mapping group are coded divided on four adjacent REs that are the same, for example, p5, p6, p11 and p12 use OCC serial numbers [1, 1, 1, 1], [1, −1, 1, −1], [1, 1, −1, −1] and [1, −1, −1, 1] respectively.

The DMRS port candidate value allocated to a user contains as many DMRS mapping groups as possible.

Similarly, in the DMRS port candidate value allocated to a user contains, if the port quantity is less than or equal to 3, the allocated ports come from different DMRS mapping groups. Alternatively, there is one of following cases.

If the base station allocates two data layers to a user, that is, two DMRS ports, the two DMRS ports allocated to the user belong to different mapping groups. For example, the ports are (p1, p3) or (p2, p9).

If the base station allocates three data layers to a user, that is, three DMRS ports, the three DMRS ports allocated to the user belong to different mapping groups. For example, the user can be allocated ports (p1, p3, p5), (p2, p4, p6), (p7, p9, p11) or (p8, p10, p12).

If the base station allocates four data layers to a user, that is, four DMRS ports, the four DMRS ports allocated to the user belong to different mapping groups. For example, the user can be allocated ports (p1, p3, p5, p7) or (p2, p4, p6, p8).

Application Embodiment 5

In the NR, it is agreed that the DMRSs are divided into multiple DMRS groups, and different DMRS groups can have different QCL assumptions, that is, one DMRS group corresponds to one QCL indication. Of course, like the LTE, QCL assumptions of all DMRS ports can the same.

However, how to group DMRSs is yet not discussed. If the DMRSs are grouped using high-layer RRC signaling, flexibility will be sacrificed. If downlink control information (DCI) is used for notifying how to group DMRSs on the physical layer, huge overhead will occur.

There is a method in which the DMRS mapping group can be used for implicitly indicate QCL-DMRS groups, that is, some implicit rules are defined to bind DMRS mapping groups and QCL-DMRS groups.

The QCL assumption of the same DMRS mapping port group is the same. The QCL assumptions of different DMRS mapping groups depend on the number of QCL-DMRS groups.

If the base station allocates three data layers to a user, that is, three DMRS ports, in the three DMRS ports allocated to the user, if the number of QCL-DMRS groups is 2, two of the allocated DMRS ports can belong to the same mapping group and correspond to one QCL assumption, and the remaining port belongs to another mapping group and also corresponds to one QCL assumption. For example, in FIG. 16, ports allocated by the base stations to the user are p1, p2 and p3, and two QCL indications correspond to two QCL-DMRS groups respectively. In this case, since p1 and p2 belong to the same mapping group, they belong to one QCL-DMRS group and correspond to one QCL assumption. Since p3 belongs to a different mapping group, p3 belongs to one QCL-DMRS group separately, and the QCL assumption which p3 corresponds to may be different from the QCL assumption which p1 and p2 correspond to. If the base station configures a user one QCL-DMRS group, no matter how mapping groups are divided, QCL assumptions of all ports are the same.

Application Embodiment 6

The front loaded reference signal is generally suitable for a case where the user speed is not high. If the user speed is high and delay requirements are not high, additional DMRSs should be configured to estimate the Doppler effect. In order to support different user speeds, the number of additionally configured DMRS symbols may be different. For example, for a user with the user speed of 120 km/h, besides the front loaded DMRS, one time domain symbol needs to be additionally configured for DMRS transmission, and if the user speed is 500 km/h, three time domain symbols need to be additionally configured for DMRS transmission. Therefore, according to the different user speeds, the base station can configure some possible DMRS patterns to the user by using the high-layer signaling, and then dynamically notify the user of the specific DMRS patterns and parameters by using the physical layer signaling.

Since the patterns of the uplink and downlink DMRSs are related to the user speed and the user speed is UE-specific, the parameters of the DMRS can be configured in an uplink and downlink joint manner. For example, the base station configures one or more DMRS patterns to the user using high-layer signaling, and this or these patterns are applicable to uplink and downlink. In addition to the pattern, whether the multiplexing mode of the DMRS in the time domain is the OCC, the number of ports, the time domain symbol position, the port serial number and the like can also be configured in the uplink and downlink joint manner. Assuming that the user speed is 500 km/h, the base station may configure the pattern shown in FIG. 23 to the user via high layer signaling, where FIG. 23 is a schematic diagram of a DMRS pattern according to an application embodiment 6 of the present application, and the configured two patterns are simultaneously applicable to uplink and downlink.

In addition, due to the influence of phase noise at high frequency, as shown in FIG. 22, in a case where the front loaded signal configures two adjacent OFDM symbols for DMRS transmission, the application of the time domain OCC may be affected. This is because the phase noise may generate a phase rotation for the channels of different OFDM symbols, which makes channels of adjacent OFDM symbols different, degrading channel estimation performance. Therefore, in the presence of phase noise at high frequency, the time domain OCC is preferably not used, and TDM or simple repetition may be used.

Similarly, for other signals, such as CSI-RS, physical uplink control channel (PUCCH), etc., whether the multiplexing mode in the time domain is the time domain OCC depends on the influence of the phase noise reference signal, where the influence of the phase noise reference signal is user-specific or base station-specific. The PUCCH is an uplink control channel used by a user to feed back ACK/NACK or CSI. In general, since a long format of the PUCCH may occupy multiple time domain symbols, whether to adopt the OCC in the time domain requires the base station to notify the user. Similarly, if the CSI-RS occupies multiple time domain symbols in the time domain, the base station is also required to inform whether to adopt the time domain OCC. In an embodiment, in the discussion about whether to use the code division multiplexing in the time domain herein, these signals often contain multiple adjacent symbols in the time domain.

For a user, when multiple signals occupy multiple time domain symbols in the time domain, whether the multiplexing mode of time domain code division can be adopted in the time domain can be notified in a joint mode, and is not required to be notified separately for each signal. For example, the base station does not need to separately notify the user of the time domain multiplexing mode of the PUCCH, the time domain multiplexing mode of the CSI-RS, the time domain multiplexing mode of the DMRS, and the like. And the base station needs to use the same signaling to inform whether the time domain multiplexing mode of the PUCCH, the CSI-RS and the DMRS is the time domain code division, that is, the time domain multiplexing mode of the PUCCH, the CSI-RS, and the DMRS is the same. In an embodiment, the base station uses high-layer RRC signaling to inform whether the time domain multiplexing is the time domain code division. Of course, the signaling by the base station with the MAC CE is not excluded.

In an embodiment, the base station uses higher layer RRC signaling to configure the phase tracking reference signal for the user in the presence of phase noise. The base station can use the RRC signaling to inform whether the time domain multiplexing mode of the signals (PUCCH, DMRS, CSI-RS) is code division multiplexing.

In an embodiment, the base station can use joint high-layer signaling to notify the user whether the time domain multiplexing mode of the multiple signals is code division multiplexing, where the multiple signals may include an uplink signal and a downlink signal, for example, including at least two of the following: a PUCCH, a CSI-RS, a downlink DMRS, an uplink DMRS, and an uplink SRS. The joint high-layer signaling is generally referred to as RRC signaling. In an embodiment, the RRC signaling may be RRC signaling that notify whether a PTRS exists.

If the uplink and downlink signaling are designed separately, for uplink, the base station can use the joint high-layer signaling to notify the user whether the time domain multiplexing mode of multiple uplink signals is code division multiplexing, where the multiple uplink signals include multiple uplink signals or uplink reference signals, for example, including at least two of a PUCCH, an uplink DMRS and an uplink SRS, the joint high-layer signaling is generally referred to as RRC signaling, and in an embodiment, the RRC signaling may be RRC signaling notifying whether an uplink PTRS exists; similarly, for downlink, the base station can use the joint high-layer signaling to notify the user whether the time domain multiplexing mode of multiple downlink signals is code division multiplexing, where the multiple downlink signals include multiple downlink signals or downlink reference signals, for example, including a downlink DMRS and a CSI-RS, the joint high-layer signaling is generally referred to as RRC signaling, and in an embodiment, the RRC signaling may be RRC signaling notifying whether a downlink PTRS exists.

In an embodiment, even if the high-layer signaling configures the PTRS to the user, the actual PTRS does not necessarily exist, and whether the PTRS exists is related to a scheduling resource bandwidth, an MCS and the like allocated by the user.

The joint signaling is used for configuring whether the multiplexing mode of multiple signals in the time domain is the code division multiplexing. The multiple signals include at least two of following signals to indicate high-layer signaling indicating whether a PTRS exists: an uplink DMRS, a downlink DMRS, a PUCCH and a CSI-RS. The joint signaling is used for configuring parameters of the DMRS and the downlink DMRS.

Application Embodiment 7

The first communication node implicitly notifies a multiplexing mode between the first DMRS and corresponding data by using the size of a transmission resource. The size of the transmission resource includes at least one of the following:

the number of time domain symbols contained in the slot for transmitting the first DMRS;

the number of time domain symbols of the first DMRS; and the number of time domain symbols allocated for data transmission.

In an embodiment, the multiplexing mode between the first DMRS and the corresponding data refers to whether frequency division multiplexing is included.

In an embodiment, if the number of time domain symbols of the transmission resource is greater than X, the multiplexing mode of the DMRS and the corresponding data may not include the FDM, and if the number is less than or equal to X, the multiplexing mode of the DMRS and the corresponding data may include the FDM.

The first DMRS and the corresponding data are that this DMRS is used for demodulating the corresponding data layer. In other words, the DMRS and the corresponding data use the same precoding or correspond to the same port.

As shown in FIG. 16, if the size of the transmission resource refers to the number of time domain symbols contained in a slot, the number of symbols contained in the slot is 14. In this case, the number of symbols occupied by the DMRS is 1. In this case, although one time domain symbol of the DMRS can support six ports at most, not all of first communication nodes of each slot can transmit DMRSs of six ports. For example, in a cell with fewer users, when users in the cell require fewer ports of the DMRS, for example, only user #1 uses one port in the cell and for example, uses the port p1 shown in FIG. 16, on a time domain symbol where the DMRS is located, besides four REs occupied by the port p1, remaining eight REs are used for data transmission. In other words, since ports p3 to p6 are not transmitted, then eight REs they occupy can be used for data transmission. In this case, if the base station transmits the data to the UE #1 on the resources occupied by ports p3 to p6, the ports of the data of the UE #1 and the DMRS of the UE #1 use the FDM.

However, if there is another user, a UE #2, in the cell and the UE #2 occupies ports p3 to p6, the resources on ports p3 to p6 cannot be used for sending data to the UE #1. Therefore, for the UE #1, the base station cannot transmit the data to the UE #1 on the resources occupied by ports p3 to p6.

Therefore, additional signaling may be required to notify whether the data and the DMRS of the UE #1 can be FDM.

However, since the number of symbols of the slot is large, that is, there are many REs for transmitting data, for the UE #1, it can be predefined that no data is transmitted on the time domain symbol where the DMRS is located, such that no additional dynamic control signaling is needed to notify the user whether the multiplexing mode of the data and the DMRS of the user includes the FDM, because in this case, the DRS and the data of the user are always predefined time domain multiplexing (TDM). In this case, since the number of symbols in the slot is large, the number of REs that the data can use is large, and as shown in FIG. 16, a total of 120 REs from the symbol 5 to the symbol 14 are available, such that even if the resources on ports p3 to p6 are used for data transmission, the increased transmission efficiency is not high, only 8/120, which is less than 7%. Moreover, if the resources on ports p3 to p6 are not used for data transmission, the DMRS of the user can be increased in power, that is, the transmit power originally on ports p3 to p6 can be borrowed to ports p1 and p2. Therefore, if the size of the transmission resource refers to the number of time domain symbols contained in a slot, the number of symbols contained in the slot is large, and then the multiplexing mode of the DMRS and the corresponding data cannot be the FDM, that is, the multiplexing mode can only be the TDM, that is, the DMRS and the corresponding data are not transmitted at the same time. In this case, the number of symbols occupied by the DMRS is not large, such as only one or two symbols. Otherwise, not transmitting the data on the time domain symbols of the DMRS would cause a huge waste.

However, if the first slot in which the first DMRS is located contains a small number of time domain symbols, such as, a slot containing seven time domain symbols, or a mini slot, for example, containing two time domain symbols, it will cause a waste when data is not transmitted on the time domain symbols of the DMRS by default. Since if the number of ports is small, for example, the base station transmits a total of one port, p1, to the UE #1, the remaining eight REs occupy a larger proportion in resources of a total of seven symbols. If the first slot has only two time domain symbols, even if the overhead of the control channel is not considered, one PRB includes 24 REs, and the proportion of resources occupied by the ports p3 to p6 in the slot is one third. In this case, additional signaling is required to notify whether the DMRS and the corresponding data can be the FDM. Of course, if the number of symbols contained in a slot is small, and the number of ports of the DMRS that can be supported in the slot is limited, and the DMRS and the corresponding data can be the FDM by default.

That is, a binding relationship between the slot format or the number of symbols contained in the slot and the multiplexing mode of the DMRS and the data is established, such that in some cases, no additional dynamic signaling is required to notify the user of the multiplexing mode of the DMRS and the data. According to the above example, when the number of symbols contained in a slot is large, the FDM is cannot be used by default, and signaling is not needed for notification. In this case, the number of symbols occupied by the DMRS is not large, such as only one or two symbols. Otherwise, not transmitting data on the time domain symbols of the DMRS would cause a huge waste.

Even if the number of symbols contained in the first slot is large, if the number of time domain symbols occupied by the DMRS is large, for example, as shown in the left figure of FIG. 23, in this case, the DMRS occupies four time domain symbols, and in this case, since end-user scheduling is often performed, it can be considered that the multiplexing mode of the DMRS and the data may include the FDM. If the number of symbols occupied by the DMRS is small, it can be considered that the multiplexing mode of the DMRS and the data cannot include the FDM by default.

In other words, if the size of the transmission resource is the number of time domain symbols of the first DMRS, the multiplexing mode of the DMRS and the data may include the FDM if the number of time domain symbols of the DMRS is greater than X, and the multiplexing mode of the DMRS and the data may not include the FDM if the number of time domain symbols of the DMRS is less than or equal to X. X is an integer. For example, X=1 or 2.

In an embodiment, X may be bound to the number of symbols contained in a slot. For example, X=2 if a slot contains 14 symbols, and X=1 if a slot contains a smaller number of symbols, such as 7. In an embodiment, the specified signaling may include RRC signaling.

In another solution, in order to utilize resources more effectively, if the size of the transmission resource is the number of time domain symbols of the first DMRS, the multiplexing mode of the DMRS and the data may include the FDM if the number of time domain symbols of the DMRS is greater than X, and the multiplexing mode of the DMRS and the data may or may not include the FDM if the number of time domain symbols of the DMRS is equal to or less than X. In this case, additional signaling is required to notify the user. X is an integer. For example, X=1 or 2. In an embodiment, X may be bound to the number of symbols contained in a slot. For example, X=2 if a slot contains 14 symbols, and X=1 if a slot contains a smaller number of symbols, such as 7. In an embodiment, the specified signaling may include RRC signaling.

Similar to the number of symbols contained in the slot, the size of the transmission resource may also be considered as the number of symbols allocated for transmission. When the number of symbols allocated by the transmission resource is large, for example, the downlink data area allocated to the UE #1 by the base station is from the fourth to the fourteenth symbols, as shown in FIG. 13, in this case, even if the REs occupied by ports p3 to p6 are not used for user to transmit data, the waste is not large, and the control signaling overhead is saved. In this case, it can be considered that the multiplexing mode between the DMRS and the corresponding data cannot be the FDM. However, as shown in FIG. 16, even if the slot contains 14 symbols, if the number of time domain symbols scheduled by the base station to the user UE #1 is small, for example, containing symbols four to seven symbols, a total of four symbols are allocated to the user UE #1, and symbols 8 to 14 are not allocated to the user. If the REs occupied by the ports p3 to p6 are not suitable for transmitting data, the waste ratio is large. In this case, it can be considered that the FDM can be included between the DMRS and the corresponding data, and then additional signaling is required to notify the user whether ports p3 to p6 can transmit data to the user.

In other words, the first communication node implicitly notifies whether the first DMRS and the corresponding data can be transmitted simultaneously by using the size of a transmission resource. The size of the transmission resource includes at least one of the following:

the number of time domain symbols contained in the slot for transmitting the first DMRS;

the number of time domain symbols of the first DMRS; and the number of time domain symbols allocated for data transmission.

In an embodiment, the multiplexing mode between the first DMRS and the corresponding data refers to whether frequency division multiplexing is included.

The first communication node generally refers to a base station and of course it may also be a user. The second communication demodulation may also be a user or a base station.

Apparently, it should be understood by those skilled in the art that each of the above-mentioned modules or steps of the present application may be implemented by a general-purpose computing device, the modules or steps may be concentrated on a single computing device or distributed on a network composed of multiple computing devices, and alternatively, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

What is claimed is:

1. An information transmission method, comprising:

transmitting, by a first communication node, a first demodulation reference signal (DMRS) within a first slot;

in a case where the first DMRS corresponds to M ports, the M ports correspond to N DMRS mapping groups, and the N DMRS mapping groups corresponds to N quasi-co-located (QCL) assumptions, wherein whether the N QCL assumptions are the same depends on a number of QCL indications, N is equal to 2 and the number of the QCL indications is 1 or 2; in a case where the number of the QCL indications is 1, the two QCL assumptions are the same, and in a case where the number of the QCL indications is 2, the two QCL assumptions are the different from each other;

wherein ones of the M ports in a same one of the plurality of DMRS mapping groups are code-division multiplexed on a plurality of resource elements and are differentiated via orthogonal cover codes (OCCs), and M is an even number.

2. The method of claim 1, wherein in a case where a number of ports contained in a port candidate value allocated to a user terminal is less than or equal to M/2, the ports contained in the port candidate value come from different ones of the plurality of demodulation reference signal mapping groups.

3. The method of claim 2, wherein in a case where the number of ports contained in the port candidate value allocated to the user terminal is two, the ports contained in the port candidate value come from two different ones of the plurality of demodulation reference signal mapping groups.

4. A data demodulation method, comprising:

receiving, by a first communication node, first information within a first slot; wherein the first information comprises a data channel and a first demodulation reference signal (DMRS); and demodulating, by the first communication node, the data channel according to the first DMRS;

wherein candidate positions of the first DMRS within the first slot at least overlap with candidate positions of a second DMRS within a second slot, the second slot is a slot within which a second communication node receives second information, the second information comprises the second DMRS, and a reception direction of the first DMRS within the first slot is different from a reception direction of the second DMRS within the second slot; and wherein in a case where the first DMRS corresponds to M ports, the M ports correspond to N DMRS mapping groups, and the N DMRS mapping groups corresponds to N quasi-co-located (QCL) assumptions, wherein whether the N QCL assumptions are the same depends on a number of QCL indications, N is equal to 2 and the number of the QCL indications is 1 or 2; in a case where the number of the QCL indications is 1, the two QCL assumptions are the same, and in a case where the number of the QCL indications is 2, the two QCL assumptions are the different from each other.

5. A communication node, comprising: a memory, a processor coupled with the processor, and a computer program stored in the memory and operable on the processor, wherein the processor, when executing the computer program, is configured to implement the method of claim 1.

6. A communication node, comprising: a memory, a processor coupled with the processor, and a computer program stored in the memory and operable on the processor, wherein the processor, when executing the computer program, is configured to implement the method of claim 4.

7. A non-transitory storage medium, comprising stored programs, wherein, when executed, the programs execute the method of claim 1.

8. A non-transitory storage medium, comprising stored programs, wherein, when executed, the programs execute the method of claim 4.

* * * * *